(12) United States Patent
Shimada

(10) Patent No.: US 9,160,893 B2
(45) Date of Patent: Oct. 13, 2015

(54) IMAGE RECORDING SYSTEM AND IMAGE RECORDING METHOD

(75) Inventor: Takuya Shimada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 13/208,274

(22) Filed: Aug. 11, 2011

(65) Prior Publication Data

US 2012/0044510 A1    Feb. 23, 2012

(30) Foreign Application Priority Data

Aug. 20, 2010 (JP) ................. 2010-185199
Jul. 5, 2011 (JP) ................. 2011-149350

(51) Int. Cl.
| | |
|---|---|
| B41J 29/38 | (2006.01) |
| B41J 2/21 | (2006.01) |
| B41J 2/01 | (2006.01) |
| H04N 1/60 | (2006.01) |
| B41J 19/14 | (2006.01) |

(52) U.S. Cl.
CPC ............ *H04N 1/6058* (2013.01); *B41J 19/147* (2013.01)

(58) Field of Classification Search
USPC ......... 358/1.9; 347/43, 12, 104; 395/109, 104
See application file for complete search history.

(56) References Cited

U.S. PATENT DOCUMENTS

| | | | | |
|---|---|---|---|---|
| 5,613,046 | A * | 3/1997 | Dermer .......................... | 358/1.9 |
| 6,547,355 | B1 * | 4/2003 | Shimada et al. ................ | 347/12 |
| 7,003,151 | B2 | 2/2006 | Shimada ....................... | 382/162 |
| 7,128,394 | B2 | 10/2006 | Takenaka ....................... | 347/43 |
| 7,420,705 | B2 | 9/2008 | Yamada et al. ................ | 358/1.9 |
| 7,450,281 | B2 | 11/2008 | Torigoe et al. ................ | 358/523 |
| 7,453,602 | B2 | 11/2008 | Shimada ....................... | 358/1.9 |
| 7,503,634 | B2 | 3/2009 | Takahashi et al. | |
| 7,755,795 | B2 | 7/2010 | Shimada ....................... | 358/1.9 |
| 7,791,760 | B2 | 9/2010 | Shimada ....................... | 358/1.9 |
| 8,013,881 | B2 | 9/2011 | Yuda et al. | |
| 2004/0051756 | A1 * | 3/2004 | Takenaka ....................... | 347/43 |
| 2008/0123147 | A1 | 5/2008 | Koase et al. | |
| 2008/0238967 | A1 * | 10/2008 | Busch et al. ..................... | 347/11 |
| 2010/0245873 | A1 | 9/2010 | Shimada ....................... | 358/1.9 |
| 2011/0267394 | A1 | 11/2011 | Ochiai et al. .................... | 347/15 |

FOREIGN PATENT DOCUMENTS

| | | |
|---|---|---|
| CN | 1836905 A | 9/2006 |
| CN | 101188662 A | 5/2008 |
| CN | 101549590 A | 10/2009 |
| JP | 6-233126 | 8/1994 |
| JP | 11-129508 A | 5/1999 |
| JP | 2004-155181 | 6/2004 |

OTHER PUBLICATIONS

Chinese Office Action dated Nov. 22, 2013 in corresponding Chinese Appl. No. 2013111901168760.

* cited by examiner

*Primary Examiner* — Marivelisse Santiago Cordero
*Assistant Examiner* — Temitayo Folayan
(74) *Attorney, Agent, or Firm* — Fitzpatrick, Cella, Harper & Scinto

(57) ABSTRACT

A color gamut is extended, and thus high color and gradation are realized. An image recording system includes: a conversion unit for converting input color signals constituting an input image into signals constituting a group of recording material overlapped structures that includes a recording material overlapped structure in which at least two or more recording materials are overlapped to form pixels; and a recording unit for recording the recording materials on a recording medium in accordance with the converted signals.

11 Claims, 19 Drawing Sheets

| R'' | G'' | B'' | W | K | Y | Y/C | C/Y | C | C/M | M/C | M | M/Y | Y/M |
|---|---|---|---|---|---|---|---|---|---|---|---|---|---|
| 0 | 0 | 0 | 0 | 1 | 0 | 0 | 0 | 0 | 0 | 0 | 0 | 0 | 0 |
| . | . | . | . | . | . | . | . | . | . | . | . | . | . |
| . | . | . | . | . | . | . | . | . | . | . | . | . | . |
| 0 | 255 | 0 | 0 | 0 | 0 | 0.5 | 0.5 | 0 | 0 | 0 | 0 | 0 | 0 |
| . | . | . | . | . | . | . | . | . | . | . | . | . | . |
| . | . | . | . | . | . | . | . | . | . | . | . | . | . |
| 0 | 255 | 255 | 0 | 0 | 0 | 0 | 0 | 1 | 0 | 0 | 0 | 0 | 0 |
| . | . | . | . | . | . | . | . | . | . | . | . | . | . |
| . | . | . | . | . | . | . | . | . | . | . | . | . | . |
| 255 | 255 | 0 | 0 | 0 | 1 | 0 | 0 | 0 | 0 | 0 | 0 | 0 | 0 |
| . | . | . | . | . | . | . | . | . | . | . | . | . | . |
| . | . | . | . | . | . | . | . | . | . | . | . | . | . |
| 255 | 255 | 255 | 1 | 0 | 0 | 0 | 0 | 0 | 0 | 0 | 0 | 0 | 0 |

| | FIRST PASS ROUND | | | SECOND PASS ROUND | | | THIRD PASS ROUND | | | FOURTH PASS ROUND | | | |
|---|---|---|---|---|---|---|---|---|---|---|---|---|---|
| | C | M | Y | K | C | M | Y | K | C | M | Y | K | C | M | Y | K |
| W | M0 | M0 | M0 | M0 | M0 | M0 | M0 | M0 | M0 | M0 | M0 | M0 | M0 | M0 | M0 | M0 |
| K | M0 | M0 | M0 | M4-1 | M0 | M0 | M0 | M4-2 | M0 | M0 | M0 | M4-3 | M0 | M0 | M0 | M4-4 |
| Y | M0 | M0 | M4-1 | M0 | M0 | M0 | M4-2 | M0 | M0 | M0 | M4-3 | M0 | M0 | M0 | M4-4 | M0 |
| Y/C | M2-1 | M0 | M0 | M0 | M2-2 | M0 | M0 | M0 | M2-1 | M0 | M0 | M0 | M2-2 | M0 | M0 | M0 |
| C/Y | M0 | M0 | M2-1 | M0 | M0 | M0 | M2-2 | M0 | M0 | M0 | M2-1 | M0 | M0 | M0 | M2-2 | M0 |
| C | M4-1 | M0 | M0 | M0 | M4-2 | M0 | M0 | M0 | M4-3 | M0 | M0 | M0 | M4-4 | M0 | M0 | M0 |
| C/M | M0 | M2-1 | M0 | M0 | M0 | M2-2 | M0 | M0 | M0 | M2-1 | M0 | M0 | M0 | M2-2 | M0 | M0 |
| M/C | M2-1 | M0 | M0 | M0 | M2-2 | M0 | M0 | M0 | M2-1 | M0 | M0 | M0 | M2-2 | M0 | M0 | M0 |
| M | M0 | M4-1 | M0 | M0 | M0 | M4-2 | M0 | M0 | M0 | M4-3 | M0 | M0 | M0 | M4-4 | M0 | M0 |
| M/Y | M0 | M0 | M2-1 | M0 | M0 | M0 | M2-2 | M0 | M0 | M0 | M2-1 | M0 | M0 | M0 | M2-2 | M0 |
| Y/M | M0 | M2-1 | M0 | M0 | M0 | M2-2 | M0 | M0 | M0 | M2-1 | M0 | M0 | M0 | M2-2 | M0 | M0 |

| W | Y | W |
|---|---|---|
| Y | W | Y/C |
| Y/C | Y/C | Y |

| 1 | 0 | 1 |
|---|---|---|
| 0 | 1 | 0 |
| 0 | 0 | 0 |

| 0 | 1 | 0 |
|---|---|---|
| 1 | 0 | 0 |
| 0 | 0 | 1 |

| 0 | 0 | 0 |
|---|---|---|
| 0 | 0 | 1 |
| 1 | 1 | 0 |

FIG.11D

| 0 | 0 | 0 |
|---|---|---|
| 0 | 0 | 0 |
| 0 | 0 | 0 |

FIG.11E

| | FORWARD PATH | | | | | | RETURN PATH | | | | | |
|---|---|---|---|---|---|---|---|---|---|---|---|---|
| | Y1 | C1 | M | K | C2 | Y2 | Y1 | C1 | M | K | C2 | Y2 |
| W | M0 | M0 | M0 | M0 | M0 | M0 | M0 | M0 | M0 | M0 | M0 | M0 |
| K | M0 | M0 | M0 | M1 | M0 | M0 | M0 | M0 | M0 | M1 | M0 | M0 |
| Y | M2-1 | M0 | M0 | M0 | M0 | M2-2 | M0 | M0 | M0 | M0 | M0 | M2-2 |
| Y/C | M1 | M1 | M0 | M0 | M0 | M0 | M0 | M1 | M0 | M0 | M1 | M1 |
| C/Y | M0 | M0 | M0 | M0 | M1 | M1 | M0 | M0 | M0 | M0 | M0 | M0 |
| C | M0 | M2-1 | M0 | M0 | M2-1 | M0 | M0 | M2-1 | M0 | M0 | M2-1 | M0 |
| C/M | M0 | M1 | M1 | M0 | M0 | M0 | M1 | M1 | M1 | M0 | M1 | M0 |
| M/C | M0 | M1 | M1 | M0 | M1 | M0 | M1 | M0 | M1 | M0 | M0 | M0 |
| M | M0 | M0 | M1 | M0 | M0 | M0 | M0 | M0 | M1 | M0 | M0 | M0 |
| M/Y | M0 | M0 | M1 | M0 | M0 | M1 | M0 | M0 | M1 | M0 | M0 | M0 |
| Y/M | M1 | M0 | M1 | M0 | M0 | M0 | M1 | M0 | M1 | M0 | M0 | M1 |

| R″ | G″ | B″ | W | K | Y | M | C | Y/C | C/M | M/Y |
|---|---|---|---|---|---|---|---|---|---|---|
| 0 | 0 | 0 | 0 | 1 | 0 | 0 | 0 | 0 | 0 | 0 |
| . | . | . | . | . | . | . | . | . | . | . |
| . | . | . | . | . | . | . | . | . | . | . |
| 0 | 255 | 0 | 0 | 0 | 0 | 0 | 0 | 1 | 0 | 0 |
| . | . | . | . | . | . | . | . | . | . | . |
| 0 | 255 | 128 | 0 | 0 | 0 | 0 | 0.5 | 0.5 | 0 | 0 |
| . | . | . | . | . | . | . | . | . | . | . |
| 0 | 255 | 255 | 0 | 0 | 0 | 0 | 1 | 0 | 0 | 0 |
| . | . | . | . | . | . | . | . | . | . | . |
| . | . | . | . | . | . | . | . | . | . | . |
| 255 | 255 | 0 | 0 | 0 | 1 | 0 | 0 | 0 | 0 | 0 |
| . | . | . | . | . | . | . | . | . | . | . |
| . | . | . | . | . | . | . | . | . | . | . |
| 255 | 255 | 255 | 1 | 0 | 0 | 0 | 0 | 0 | 0 | 0 |

|    | 1 | 2 | 3 | 4 | 5 | 6 | 7 | 8 | 9 | 10 | 11 | 12 | 13 | 14 | 15 | 16 |
|----|---|---|---|---|---|---|---|---|---|----|----|----|----|----|----|----|
| 1  | 1 | 193 | 49 | 241 | 13 | 205 | 61 | 253 | 4 | 196 | 52 | 244 | 16 | 208 | 64 | 255 |
| 2  | 129 | 65 | 177 | 113 | 141 | 77 | 189 | 125 | 132 | 68 | 180 | 116 | 144 | 80 | 192 | 128 |
| 3  | 33 | 225 | 17 | 209 | 45 | 237 | 29 | 221 | 36 | 228 | 20 | 212 | 48 | 240 | 32 | 224 |
| 4  | 161 | 97 | 145 | 81 | 173 | 109 | 157 | 93 | 164 | 100 | 148 | 84 | 176 | 112 | 160 | 96 |
| 5  | 9 | 201 | 57 | 249 | 5 | 197 | 53 | 245 | 12 | 204 | 60 | 252 | 8 | 200 | 56 | 248 |
| 6  | 137 | 73 | 185 | 121 | 133 | 69 | 181 | 117 | 140 | 76 | 188 | 124 | 136 | 72 | 184 | 120 |
| 7  | 41 | 233 | 25 | 217 | 37 | 229 | 21 | 213 | 44 | 236 | 28 | 220 | 40 | 232 | 24 | 216 |
| 8  | 169 | 105 | 153 | 89 | 165 | 101 | 149 | 85 | 172 | 108 | 156 | 92 | 168 | 104 | 152 | 88 |
| 9  | 3 | 195 | 51 | 243 | 15 | 207 | 63 | 255 | 2 | 194 | 50 | 242 | 14 | 206 | 62 | 254 |
| 10 | 131 | 67 | 179 | 115 | 143 | 79 | 191 | 127 | 130 | 66 | 178 | 114 | 142 | 78 | 190 | 126 |
| 11 | 35 | 227 | 19 | 211 | 47 | 239 | 31 | 223 | 34 | 226 | 18 | 210 | 46 | 238 | 30 | 222 |
| 12 | 163 | 99 | 147 | 83 | 175 | 111 | 159 | 95 | 162 | 98 | 146 | 82 | 174 | 110 | 158 | 94 |
| 13 | 11 | 203 | 59 | 251 | 7 | 199 | 55 | 247 | 10 | 202 | 58 | 250 | 6 | 198 | 54 | 246 |
| 14 | 139 | 75 | 187 | 123 | 135 | 71 | 183 | 119 | 138 | 74 | 186 | 122 | 134 | 70 | 182 | 118 |
| 15 | 43 | 235 | 27 | 219 | 39 | 231 | 23 | 215 | 42 | 234 | 26 | 218 | 38 | 230 | 22 | 214 |
| 16 | 171 | 107 | 155 | 91 | 167 | 103 | 151 | 87 | 170 | 106 | 154 | 90 | 166 | 102 | 150 | 86 |

FIG.21

IMAGE RECORDING SYSTEM AND IMAGE RECORDING METHOD

BACKGROUND OF THE INVENTION

1. Field of the Invention

The present invention relates to an image recording system and an image recording method.

2. Description of the Related Art

As a technology for realizing high color by extending the color gamut of a printer, there are technologies below. The first conventional technology is a technology that utilizes special color inks such as red, green and blue inks in addition to basic colors that are cyan, magenta, yellow and black (Japanese Patent Laid-Open No. H06-233126(1994)). For example, by addition of a red ink for reproducing a red color having a higher chroma than a red color reproduced by overlapping a magenta ink and a yellow ink, it is possible to extend the color gamut of a red region. The second conventional technology is a technology that sets an optimal color material recording order in accordance with an input color signal (Japanese Patent Laid-Open No. 2004-155181). For example, when recording is performed by overlapping dots of a yellow ink and dots of a cyan ink, recording performed by overlapping yellow and cyan in this order and recording performed by overlapping cyan and yellow in this order are different in color from each other. A color that can be reproduced only when yellow and cyan are overlapped in this order is recorded in order of yellow and cyan, and a color that can be reproduced only when cyan and yellow are overlapped in this order is recorded in order of cyan and yellow, and thus it is possible to extend a color gamut as compared with a case where recording is performed in any one of the recording orders.

However, the conventional technologies have the following problems. In the first conventional technology, it is necessary to use an ink having a high chroma. Furthermore, by the increase in the number of inks, the configuration of a printer becomes more complicated, with the result that its size is increased. In the second conventional technology, in the vicinity of colors where the recording order is changed, a gradation step difference is observed. Moreover, the shape of the color gamut is complicated, and color gamut compression processing causes the reversal of the gradation.

SUMMARY OF THE INVENTION

The present invention provides an image recording system which extends a color gamut without the addition of a new recording material and which realizes high color and gradation.

An image recording system according to the present invention includes: a conversion unit for converting input color signals constituting an input image into signals constituting a group of recording material overlapped structures that includes a recording material overlapped structure in which at least two or more recording materials are overlapped to form pixels; and a recording unit for recording the recording materials on a recording medium according to the converted signals.

According to the present invention, image recording with high color and gradation can be performed.

Further features of the present invention will become apparent from the following description of exemplary embodiments (with reference to the attached drawings).

BRIEF DESCRIPTION OF THE DRAWINGS

FIG. 6 is a schematic diagram illustrating the configuration of a pixel color conversion table;

FIGS. 10A and 10B are schematic diagrams showing an example of the setting of a pass mask in a first embodiment;

FIGS. 11A to 11E are schematic diagrams illustrating a method of generating a binarized image of each ink overlapped structure;

FIGS. 16A and 16B are schematic diagrams showing an example of the setting of a pass mask in the second embodiment;

FIGS. 19A and 19B are schematic diagrams showing an example of the setting of a pass mask in the third embodiment;

FIG. 21 is a schematic diagram showing an example of a dither matrix in the fourth embodiment.

DESCRIPTION OF THE EMBODIMENTS

The present invention will be described in detail below with reference to accompanying drawings.

First Embodiment (Schematic Configuration of an Image Recording System)

Figure 7:
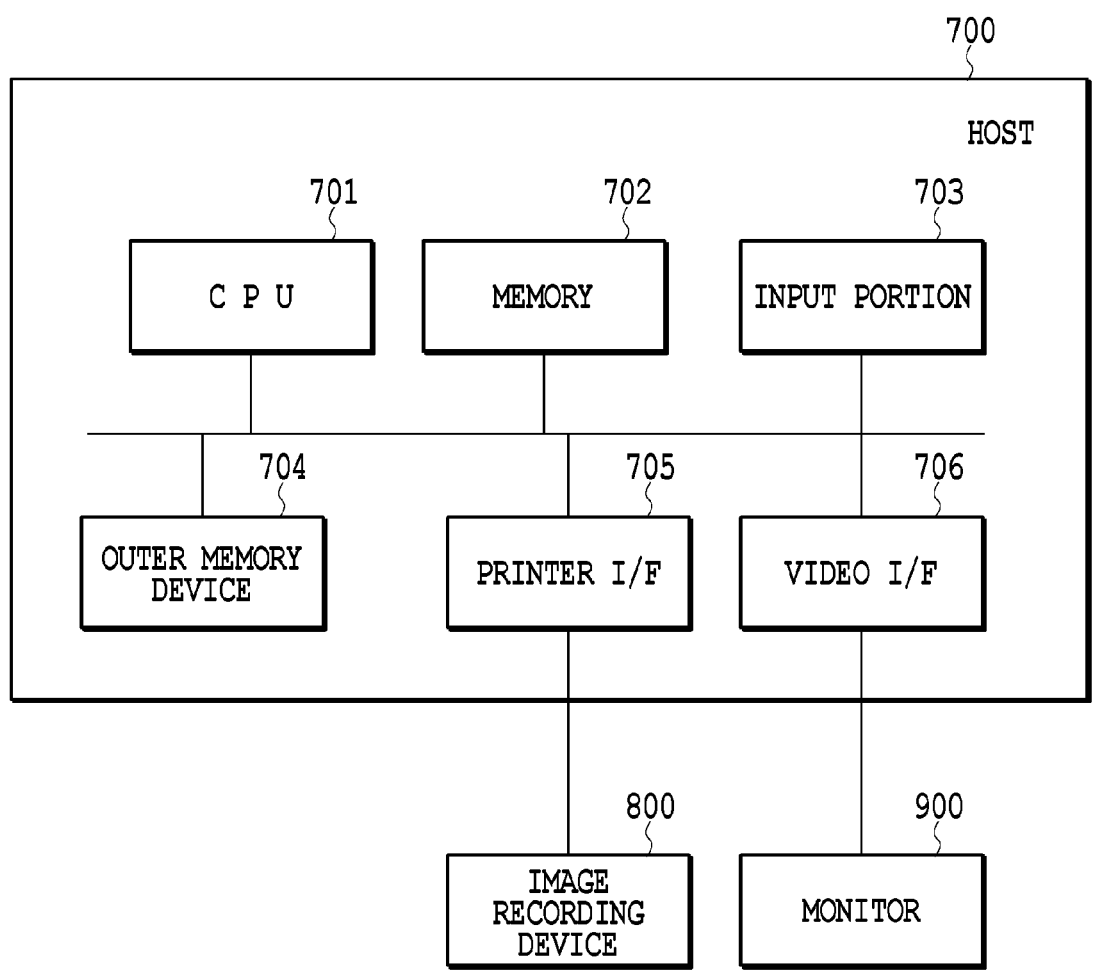
FIG. 7 is a block diagram illustrating the schematic configuration of the image recording system.

FIG. 7 is a block diagram illustrating the schematic configuration of an image recording system according to an embodiment of the present invention. In the figure, a host 700 that functions as an information processing apparatus is, for example, a personal computer; the host 700 includes a CPU 701, a memory 702, an input portion 703 such as a keyboard, an external storage device 704, a communication interface (hereinafter referred to as a printer I/F) 705 with an image recording apparatus 800; and a communication interface (hereinafter referred to as a video I/F) 706 with a monitor 900. The CPU 701 performs various types of processing according to programs stored in the memory 702; in particular, the CPU 701 performs image processing related to the present embodiment such as color matching, pixel color conversion, halftone processing and pass separation. These programs are either stored in the external storage device 704 or supplied from an unillustrated externally connected device. Moreover, the host 700 outputs various types of information to the monitor 900 through the video I/F 706, and inputs various types of information through the input portion 703. Furthermore, the host 700 is connected to the image recording apparatus 800 through the printer I/F 705, transmits record data subjected to image processing to the image recording apparatus 800 to have the record data recorded, and receives various types of information from the image recording apparatus 800.

(Schematic Configuration of the Image Recording Apparatus)

Figure 1:
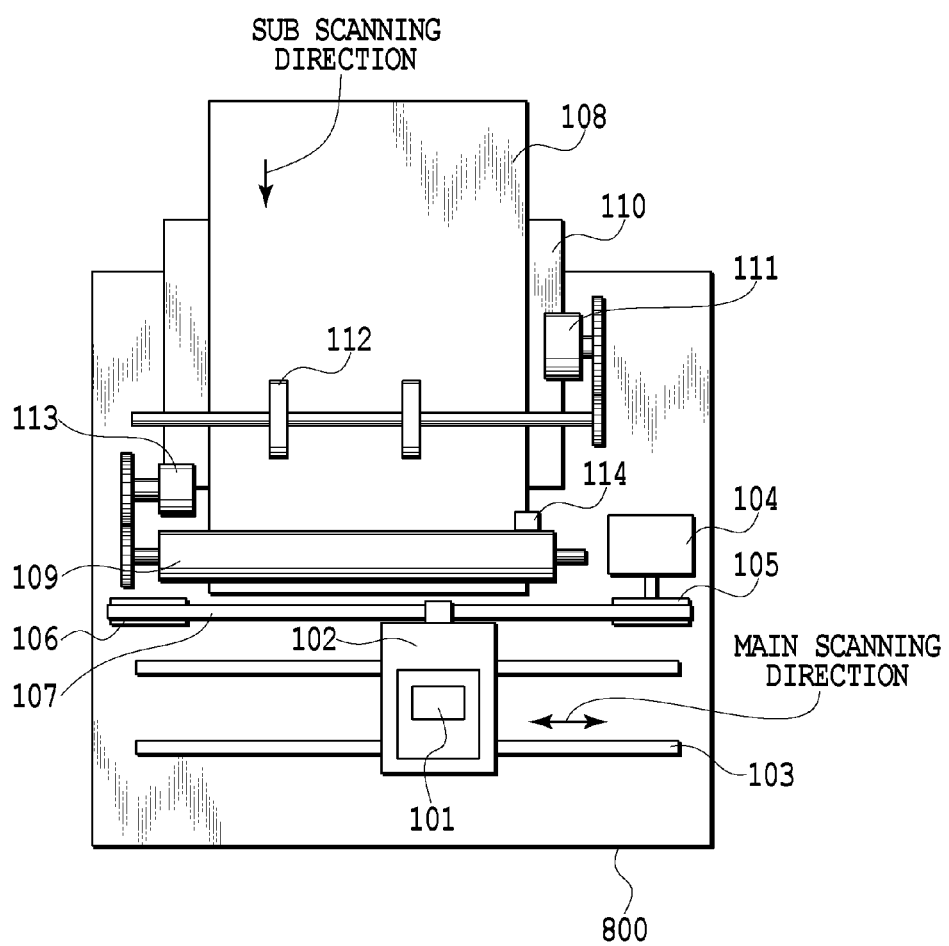
FIG. 1 is a schematic diagram illustrating the schematic configuration of an image recording apparatus.

FIG. 1 is a schematic diagram illustrating the schematic configuration of the image recording apparatus 800. The image recording apparatus 800 of the present embodiment is an inkjet printer that uses ink to perform image recording. A head cartridge 101 includes a recording head composed of a plurality of discharge ports and ink tanks for supplying ink to the recording head, and is provided with a connector for receiving a signal or the like for driving the discharge ports of the recording head. The head cartridge 101 is positioned and replaceably mounted in a carriage 102; the carriage 102 is provided with a connector holder for transmitting a drive signal and the like to the head cartridge 101 through the connector. Reference numeral 103 represents a guide shaft. The carriage 102 can reciprocate along the guide shaft 103. Specifically, while a main scanning motor 104 is used as a drive source, the carriage 102 is driven through a drive mechanism such as a motor pulley 105, a driven pulley 106 and a timing belt 107; its position and movement are controlled. It should be noted that the movement along the guide shaft 103 of the carriage is referred to as a "main scanning", and the direction of the movement is referred to as a "main scanning direction". Recording media 108 such as print sheets are mounted in an auto sheet feeder (hereinafter referred to as an ASF) 110, and at the time of recording an image, a paper feed motor 111 drives to rotate a pick up roller 112 through a gear, and the recording media 108 are separated and fed from the ASF 110 one by one. Furthermore, the recording medium 108 is transported by the rotation of a transport roller 109 to a recording start position facing the discharge port surface of the head cartridge 101 on the carriage 102. The transport roller 109 is driven through a gear while a line feeder (LF) motor 113 is used as a drive source. A determination as to whether or not the recording medium 108 is fed and a decision of a head position at the time of paper feed are performed when a paper end sensor 114 passes through the recording medium 108. The head cartridge 101 mounted in the carriage 102 is held such that the discharge port surface protrudes downward from the carriage 102 and is parallel to the recording medium 108.

(Image Recording Operation)

An image recording operation is performed as follows. First, when the recording medium 108 is transported to a predetermined recording start position, the carriage 102 moves on the recording medium 108 along the guide shaft 103, and ink is discharged through the discharge ports of the recording head while the carriage 102 is moving. Then, when the carriage 102 moves to one end of the guide shaft 103, the transport roller 109 transports the recording medium 108 only by a predetermined amount in a direction perpendicular to the scanning direction of the carriage 102. This transport of the recording medium 108 is referred to as "paper feed" or "sub scanning", and the direction of the transport is referred to as a "paper feed direction" or a "sub scanning direction". After the completion of the transport of the recording medium 108 by the predetermined amount, the carriage 102 moves again along the guide shaft 103. As described above, the scanning and the paper feed by the carriage 102 of the recording head are repeated, and thus an image is formed on the entire recording medium 108.

Figure 5:
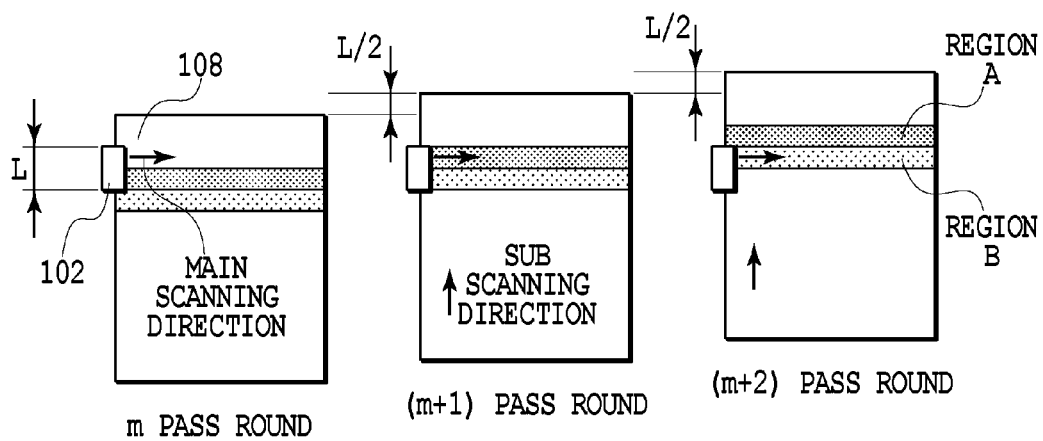
FIG. 5 is a schematic diagram illustrating a two-pass recording operation.

FIG. 5 is a schematic diagram illustrating a two-pass recording operation in which the recording head performs scanning twice on the same line of the recording medium 108 and thus an image is recorded. As shown in FIG. 5, in the two-pass recording, for example, image recording for the width L of the recording head is only performed through the main scanning by the carriage 102, and, each time recording for one line is completed, the recording medium 108 is transported by a distance L/2 in the sub scanning direction. In the example of the figure, a region A is recorded through the mth round of the main scanning and the (m+1) th round of the main scanning by the recording head, and a region B is recorded through the (m+1) th round of the main scanning and the (m+2) th round of the main scanning by the recording head. Likewise, when the nth pass recording is performed, for example, every time recording for one line is completed, the recording medium 108 is transported by a distance L/n in the sub scanning direction. In this case, the recording head performs scanning nth times on the same line of the recording medium and thus forms an image. Generally, as the number n of passes becomes larger, influences caused by variations in the amount of discharge of ink through each of the discharge ports and the direction of the discharge are suppressed and thus density unevenness is unlikely to be noticeable whereas it takes longer to perform the recording. Since, as will be described later, the image recording apparatus of the present embodiment forms a predetermined ink overlapped structure by a plurality of passes, the number n of passes needs to be two or more, for example, four-pass recording is needed to be performed.

(Recording Head)

Figure 13B:
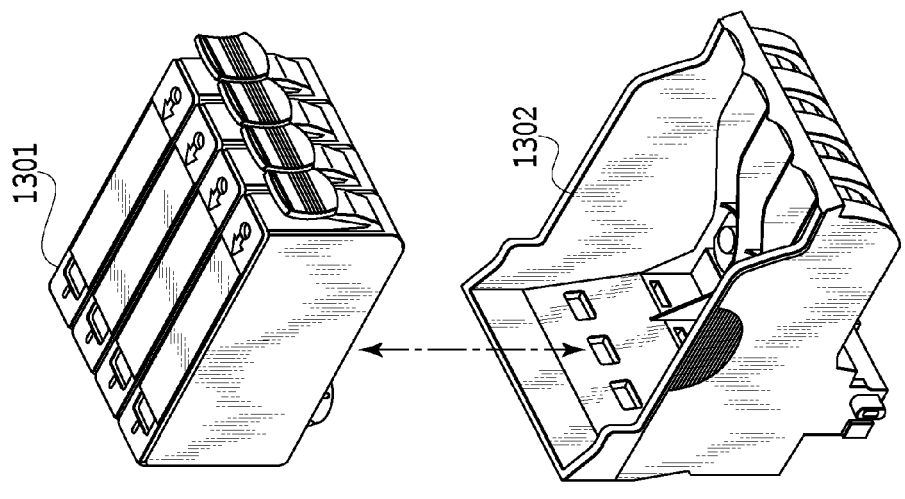
FIGS. 13A and 13B are schematic diagrams illustrating the configuration of a head cartridge.
Figure 13A:
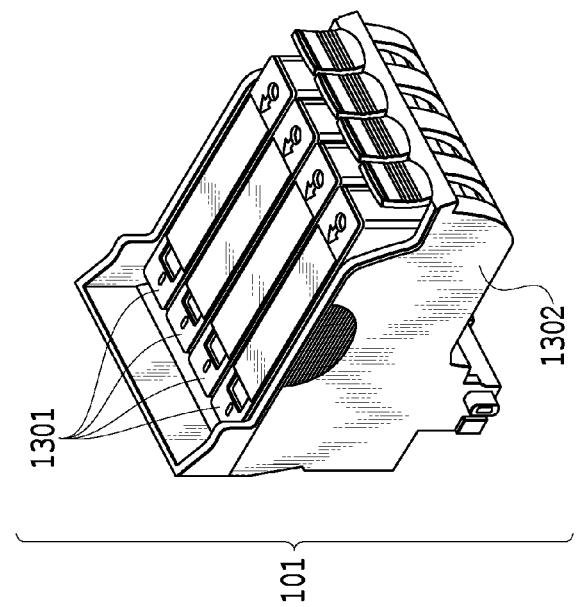
Figure 14:
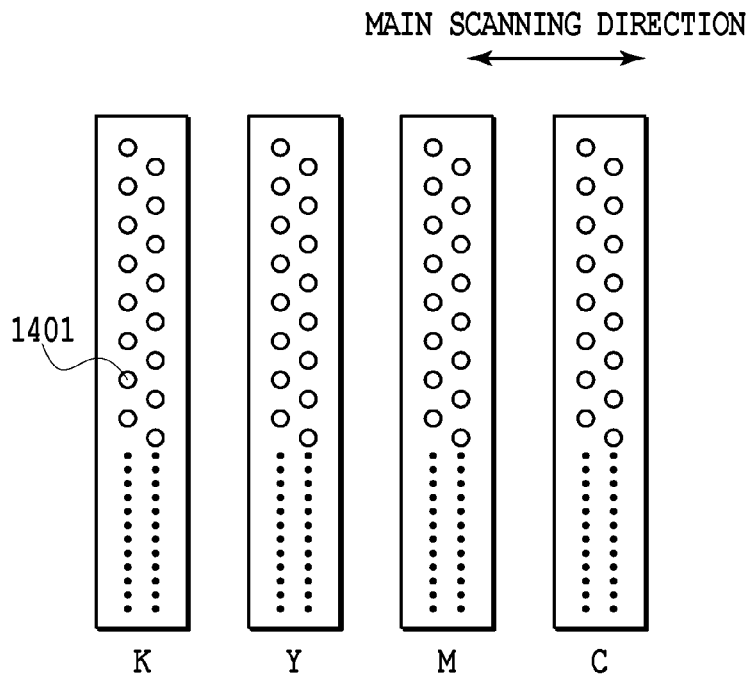
FIG. 14 is a schematic diagram showing an example of discharge port surfaces of the recording heads of the first embodiment.

FIGS. 13A and 13B are diagrams illustrating the configuration of the head cartridge 101. As shown in FIG. 13A, the head cartridge 101 is composed of the ink tanks 1301 that stores ink and the recording head 1302 that discharges the ink supplied from the ink tanks 1301 in accordance with a discharge signal. The head cartridge 101 independently has the ink tank 1301 for each of colors, for example, yellow (Y), magenta (M), cyan (C) and black (K), and, as shown in FIG. 13B, each ink tank 1301 is removable from the recording head 1302. The discharge ports of ink are positioned in the lower portion of the recording head 1302. FIG. 14 is a schematic diagram showing an example of the discharge port surface of the recording head 1302. In this example, a total of four recording heads, one for each of the colors, that is, K, Y, M and C, are aligned in the main scanning direction. In each of the recording heads, two discharge port lines for one color, each having 128 discharge ports 1401 arranged, are provided in the main scanning direction such that the two discharge port lines are displaced from other in the sub scanning direction.

(Image Processing)

Figure 2:
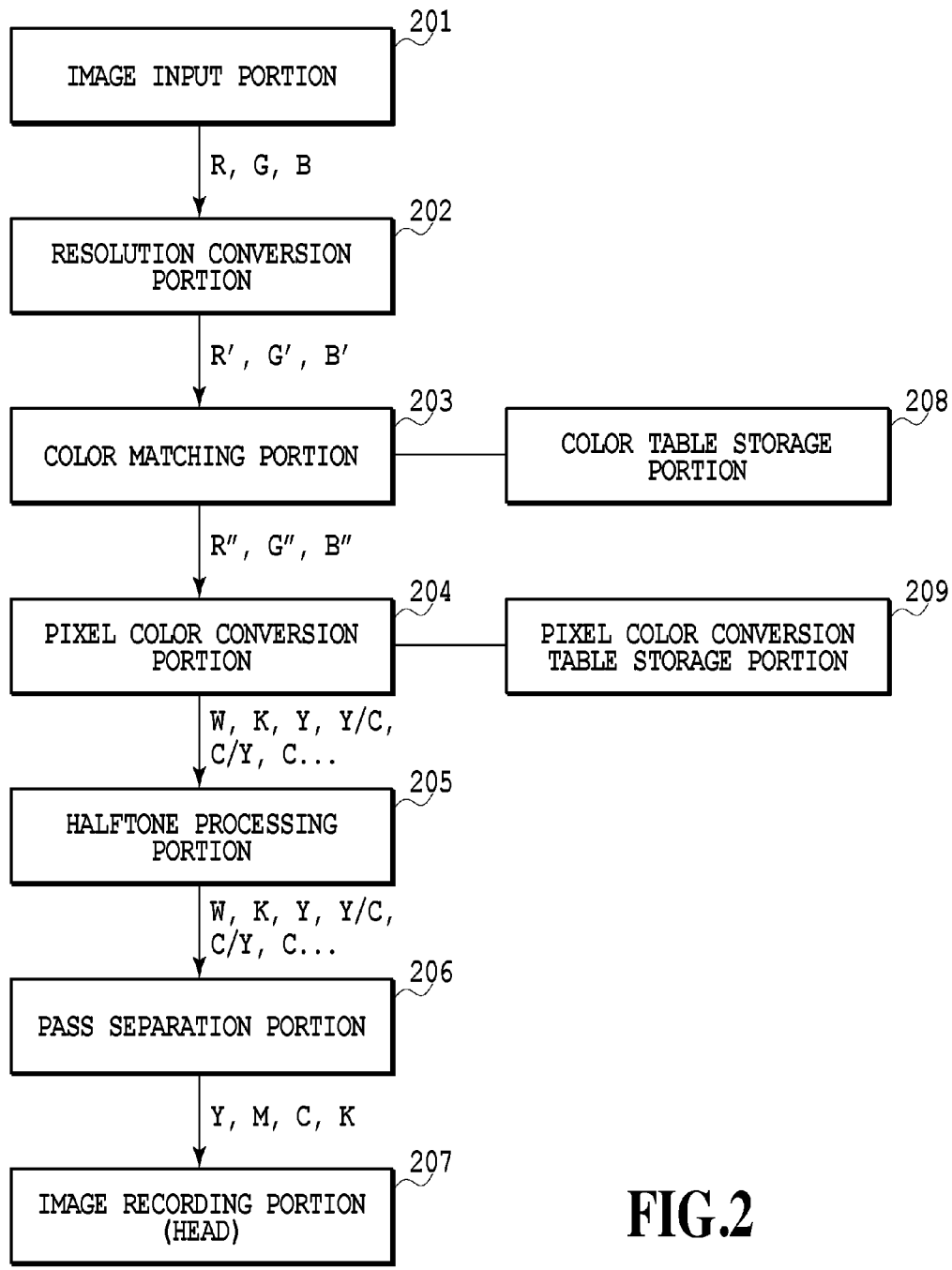
FIG. 2 is a block diagram illustrating the functional configuration of an image recording system.

FIG. 2 is a block diagram showing the functional configuration of the image recording system according to the present embodiment. The image recording system uses an image input portion 201, a resolution conversion portion 202, a color matching portion 203, a pixel color conversion portion 204, a halftone processing portion 205, a pass separation portion 206 and an image recording portion 207, and thus records an image on the recording medium. It should be noted that the image input portion 201, the resolution conversion portion 202, the color matching portion 203, the pixel color conversion portion 204, the halftone processing portion 205 and the pass separation portion 206 are realized by the host 700. The image recording portion 207 is realized by the image recording apparatus 800.

The image input portion 201 inputs image data to be recorded, and outputs input color signals (R, G and B) for the image data.

The resolution conversion portion 202 converts the resolution of the input image into the print resolution of the image recording apparatus 800, and outputs the converted color signals (R', G' and B'). For example, the print resolution is defined as a resolution in which the size of one pixel is 0.8 times the diameter of a dot recorded on the recording medium. In addition, as the method of converting the resolution, for example, a known bi-cubic method is used.

The color matching portion 203 calculates, from the color signals (R', G' and B'), color signals (R", G" and B") that depend on the image recording apparatus for recording an image of color reproduction suitable for set conditions, and outputs them. The color signals (R", G" and B") are calculated by referencing a color table stored in a color table storage portion 208, with, for example, a known three-dimensional look up table method (3DLUT method). A plurality of color tables are prepared according to the purpose of color reproduction and the type of recording medium, and are used by switching them according to set conditions. The purpose of color reproduction described here refers to, for example, "agreement with colors displayed on a monitor", "agreement with colors printed by a standard printing machine", "suitable reproduction of memory colors (such as skin color, blue color of sky and green color of grass" or the like.

The pixel color conversion portion 204 calculates, from the color signals (R", G" and B"), pixel color signals by referencing a pixel color conversion table stored in a pixel color conversion table storage portion 209, and outputs them. The pixel color signal is a color signal that has, as its component, a multi-value color signal related to each of a group of ink overlapped structures which can be recorded in each of the pixels on the recording medium. The group of ink overlapped structures is composed of, for example, 11 structures described below. The 11 structures include 5 structures, that is, a paper-based structure in which even dots of ink are not recorded, a structure in which only dots of K ink are recorded and structures in which, likewise, dots of Y, M and C are individually recorded. Furthermore, the 11 structures include a structure in which recording is performed by overlapping Y dots on C dots, and, likewise, a structure in which C dots are recorded on Y dots, a structure in which C dots are recorded on M dots, a structure in which M dots are recorded on C dots, a structure in which M dots are recorded on Y dots and a structure in which Y dots are recorded on M dots. In other words, the group of ink overlapped structures includes, in addition to normal C, M, Y and K, the structure in which dots of ink are not recorded and the structure in which recording is performed by overlapping inks. Each pixel on the recording medium is recorded with any structure of the group of ink overlapped structures including the paper-based structure. The multi-value color signal (W, K, Y, M, C, Y/C, C/Y, C/M, M/C, M/Y, Y/M) related to each of the group of ink overlapped structures indicates the ratio of the numbers of pixels of individual structures recorded on the recording medium. For example, when a pixel color signal is (W, K, Y, M, C, Y/C, C/Y, C/M, M/C, M/Y, Y/M)=(0, 0, 1, 0, 0, 0, 0, 0, 0, 0, 0), all pixels in a region corresponding to the pixel color signal are recorded only by Y ink. For example, when a pixel color signal is (0, 0, 0.5, 0, 0, 0.5, 0, 0, 0, 0, 0), this indicates a recording state where the number of pixels in a structure in which only Y in a region corresponding to the pixel color signal is recorded is equal to the number of pixels in a structure where Y is recorded on C. The total of components of the pixel color signal is constantly one. W represents a signal in the paper-based structure. "Y/C" represents a signal in which Y is recorded on C.

FIG. 6 is a schematic diagram illustrating the configuration of a pixel color conversion table stored in the pixel color conversion table storage portion 209. FIG. 6 shows a table including recording material overlapped structures in which two recording materials are selected from three recording materials, that is, yellow, cyan and magenta, and which have different recording orders of three types of combinations. As shown in FIG. 6, when, for example, the color signal (R", G" and B") for 100×100 pixels is (0, 255, 0), for the 100×100 pixels, the pixel color signal is converted into a signal indicating that the ratio of Y/C to C/Y in the number of pixels is fifty-fifty. As shown in FIG. 6, in the pixel color conversion table, pixel color signals (W, K, Y, M, C, Y/C, C/Y, C/M, M/C, M/Y, Y/M) corresponding to discrete color signals (R", G" and B") are described. A pixel color signal (W, K, Y, M, C, Y/C, C/Y, C/M, M/C, M/Y, Y/M) on an arbitrary color signal (R", G" and B") is calculated with a known 3DLUT method using the pixel color conversion table. Therefore, by appropriately setting the pixel color conversion table, it is possible to control the ratio of the numbers of pixels recorded in a plurality of ink overlapped structures having the same combination of inks. For example, in a structure in which recording is performed by overlapping Y ink dots on C ink dots and a structure in which recording is performed by overlapping C ink dots on Y ink dots, the overlapping orders of which are reverse, the combination of inks is the same between Y ink and C ink. In other words, although the order in which ink dots are overlapped to perform recording is different, Y ink and C ink are equal in the number (the ratio of the numbers of pixels) of ink dots. Through the use of the pixel color conversion table, it is possible to control the ratio of the numbers of pixels recorded in the individual structures in which recording is performed by overlapping Y ink dots on C ink dots according to the color signal (R", G" and B") and the structure in which recording is performed by overlapping C ink dots on Y ink dots.

Figure 8:
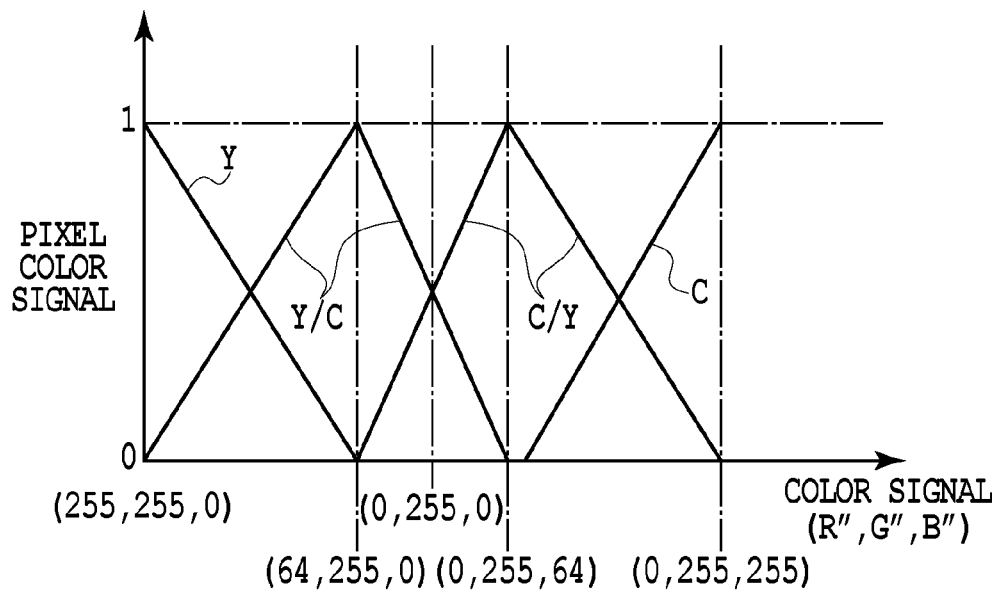
FIG. 8 is a schematic diagram showing an example of pixel color conversion.

FIG. 8 is a schematic diagram showing an example of the pixel color conversion. FIG. 8 shows a relationship between the color signal (R", G" and B") between the color signal (R", G" and B")=(255, 255, 0) and (R", G" and B")=(0, 255, 255) and each of components, which are Y, Y/C, C/Y and C, of the pixel color signal. It should be noted that values of the other components are 0 in a section of FIG. 8. According to the image recording system of the present embodiment, by appropriately setting the pixel color conversion table, as shown in FIG. 8, it is possible to perform recording such that the ratio of the numbers of pixels of individual ink overlapped structures is continuously changed according to the continuous change of the color signal (R", G" and B"). On the other hand, in a conventional technology in which the recording order is switched according to the color signal (R", G" and B"), the recording order for all pixels is switched at a point when the recording order is switched. For example, when a patch image with 100 pixels horizontally and 100 pixels vertically of the same color signal (R", G" and B") is recorded, in the conventional technology, at a point when the recording order is switched, a gradation step difference is observed because, at a point when the recording order is switched, the recording order for all 10000 pixels is switched. In the image recording system of the present embodiment, by the control of the ratio of the numbers of pixels recorded in individual ink overlapped structures of the group of ink overlapped structures through the use of the pixel color conversion table, the occurrence of the gradation step difference caused by the switching of the recording order is eliminated, with the result that image recording with high gradation characteristics can be performed.

Moreover, according to the image recording system of the present embodiment, it is possible to record a recording state (first structure) where Y/C is close to 1, a recording state (second structure) where C/Y is close to 1 and a recording state (third structure) where Y/C and C/Y are close to 0.5. In other words, in a color signal within a certain partial space (within the first partial space) in a (R", G" and B") color signal space, recording is performed in the recording state where Y/C is close to 1. Furthermore, in a color signal within another partial space (within the second partial space), recording is performed in the recording state where C/Y is close to 1, and in a color signal within yet another partial space (within the third partial space), recording is performed in the recording state where Y/C and C/Y are close to 0.5. Consequently, it is possible to reproduce a color in which pixels with a structure where recording is performed by overlapping Y on C are dominant, a color in which pixels with a structure where recording is performed by overlapping C on Y are dominant, and a color in which the pixels with the above two types of structures are dominant and are approximately equal in the number to each other. In this way, as compared with the image recording system that does not control the ink overlapped structure and the image recording system that reproduces only one type of ink overlapped structure for each of the combinations of inks, it is possible to perform image recording with an extended color gamut and high color. The color in the structure where Y/C is close to 1 is preferably recorded such that the number of pixels in the structure where recoding is performed by overlapping Y on C is four times or more the number of pixels recorded in another structure. It should be noted that this can be realized by setting, in the pixel color conversion table, at least one color signal (R", G" and B") in which the value of the Y/C component of the pixel color signal is equal to or 0.8 or more. Likewise, the color in the structure where C/Y is close to 1 is preferably recorded such that the number of pixels in the structure where recoding is performed by overlapping C on Y is four times or more the number of pixels recorded in another structure. This can be realized by setting, in the pixel color conversion table, at least one color signal (R", G" and B") in which the value of the C/Y component of the pixel color signal is equal to or 0.8 or more. In a color in the structure where Y/C and C/Y are close to 0.5, the number of pixels in the structure where recording is performed by overlapping Y on C is approximately equal to the number of pixels in the structure where recording is performed by overlapping C on Y, and the recording is preferably performed such that these numbers of pixels are four times or more the number of pixels recorded in another structure. This can be realized by setting, in the pixel color conversion table, at least one color signal (R", G" and B") in which the values of the Y/C component and the C/Y component of the pixel color signal are equal to or more than four ninths. As described above, with respect to the components of inks of the pixel color signal, even when a desired component is partially mixed with a color component in another structure, it is possible to perform the above-described image recording with high color. Meanwhile, more preferably, as shown in FIG. 8, the pixel color conversion table is set such that a color in a structure where Y/C is 1, a color in a structure where C/Y is 1 and a color in a structure where Y/C and C/Y are 0.5 are reproduced.

Figure 9:
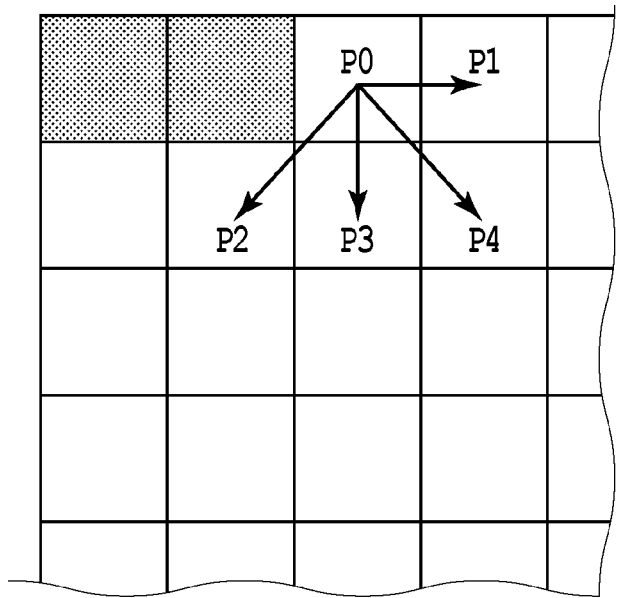
FIG. 9 is a schematic diagram illustrating the diffusion of an error signal to neighbering pixels.

The halftone processing portion 205 sets, by the use of an error diffusion method, the type of ink overlapped structure of each pixel on the recording medium, and outputs a color signal corresponding to the type. Specifically, the sum of error signals from neighboring pixels is added to the pixel color signal (first signal) of the pixel of interest, and thereafter, as the ink overlapped structure of the pixel of interest, an ink overlapped structure corresponding to one of the components having the highest value is set. For example, when the pixel color signal of the pixel of interest is (0, 0, 0.5, 0, 0, 0.5, 0, 0, 0, 0, 0), and the sum of error signals diffused from the neighboring pixels is (0, 0, 1, 0, 0, 0, 0, 0, 0, 0, 0), the following processing is performed. First, a determination signal that is the sum of the both is (W, K, Y, M, C, Y/C, C/Y, C/M, M/C, M/Y, Y/M)=(0, 0, 1.5, 0, 0, 0.5, 0, 0, 0, 0, 0). In this case, the ink overlapped structure of the pixel of interest is set to a "structure where dots of Y ink are only recorded" that is the ink overlapped structure corresponding to the Y component of the highest value. Then, for the pixel of interest, the color signal Y corresponding to the ink overlapped structure is output. Furthermore, the error signal is a value that is obtained by subtracting, from the determination signal, the pixel color signal corresponding to the set ink overlapped structure. In the example described above, the pixel color signal corresponding to the set ink overlapped structure is (W, K, Y, M, C, Y/C, C/Y, C/M, M/C, M/Y, Y/M)=(0, 0, 1, 0, 0, 0, 0, 0, 0, 0, 0). In this case, the error signal is (W, K, Y, M, C, Y/C, C/Y, C/M, M/C, M/Y, Y/M)=(0, 0, 0.5, 0, 0, 0.5, 0, 0, 0, 0, 0). FIG. 9 is a schematic diagram illustrating the diffusion of an error signal to neighboring pixels. P0 represents the pixel of interest, and the shaded portions are pixels whose ink overlapped structures have already been determined. The errors of the pixel of interest P0 are diffused at a predetermined ratio to neighboring pixels P1, P2, P3 and P4 which are around P0 and whose ink overlapped structures have not been determined. For example, the errors of P0 that are 7/16, 3/16, 5/16 and 1/16 are diffused to pixels P1, P2, P3 and P4, respectively. In the halftone processing, binarization processing is often performed for each of components of an ink signal, but by the use of the method of performing the binarization processing for each of components of the ink signal, it is impossible to control the ink overlapped structure. According to the image recording system of the present embodiment, it is possible to control the ink overlapped structure by converting the pixel color signal into a color signal corresponding to the type of ink overlapped structure, with the result that it is possible to perform image recording with high color and gradation.

The pass separation portion 206 generates the binarized image of each ink overlapped structure from the output signal of the halftone processing portion 205, applies a pass mask to the binarized image, and thus generates the binarized image corresponding to the discharge signal for each ink and each pass. The binarized image of each ink overlapped structure is an image in which a pixel whose ink overlapped structure is set by the halftone processing portion 205 is set to 1, and in which the other pixels are set to 0. FIGS. 11A to 11E are schematic diagrams illustrating the method of generating the binarized image. FIG. 11A shows an example of a 3 pixel×3 pixel image based on the ink overlapped structure of each pixel set by the halftone processing portion 205. In this example, the binarized image of a "paper-based structure where dots of any ink are not recorded" W is generated as shown in FIG. 11B. Likewise, the binarized image of a "structure where only the dots of Y ink are recorded" Y is generated as shown in FIG. 11C, the binarized image of a "structure where recording is performed by overlapping the dots of Y ink on the dots of C ink" Y/C is generated as shown in FIG. 11D, and the binarized image of the other structures is generated as shown in FIG. 11E. FIGS. 10A and 10B are schematic diagrams showing an example of the setting of a pass mask. FIG. 10A shows the types of ink overlapped structures and the types of color materials and pass mask numbers corresponding to the pass number. FIG. 10B shows an example of a pass mask corresponding to each of the pass mask numbers. According to FIGS. 10A and 10B, a binarized image corresponding to the discharge signal of C ink in a first pass round is generated by performing an OR-operation on a result obtained by applying the mask of M2-1 to the binarized image of Y/C, a result obtained by applying the mask of M4-1 to the binarized image of C, and a result obtained by applying the mask of M2-1 to the binarized image of M/C.

The image recording portion 207 discharges each ink based on the output signal of the pass separation portion 206, and records an image on the recording medium.

(Image Recording Procedure)

Figure 3:
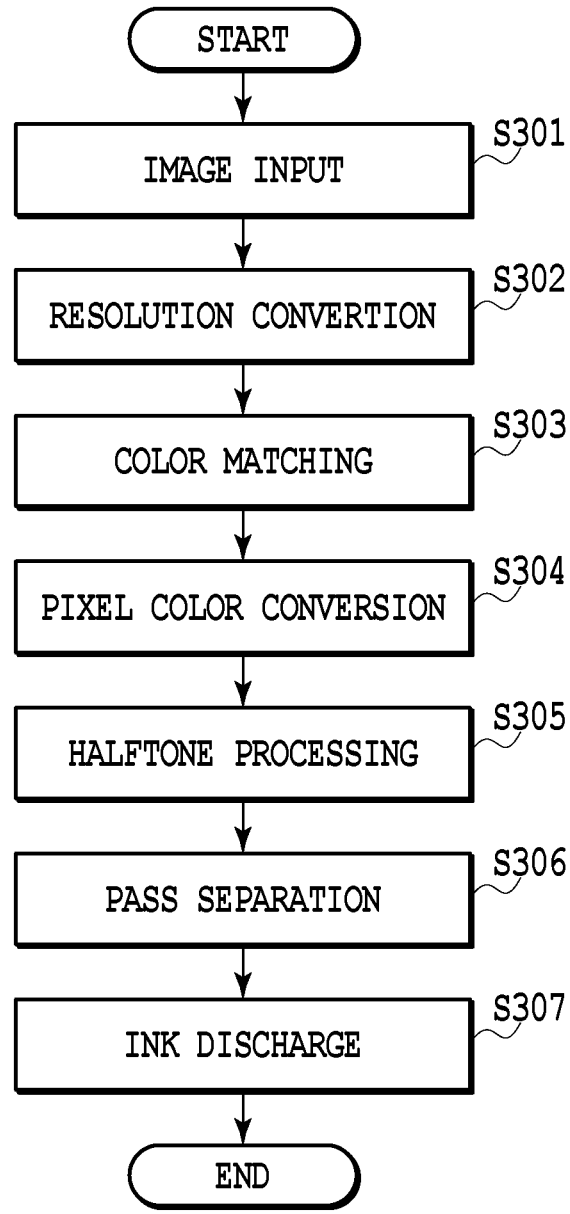
FIG. 3 is a flowchart showing an image recording procedure in each embodiment.

FIG. 3 is a flowchart showing the image recording procedure of the image recording system according to the present embodiment. First, in step S301, image data to be recorded is input. Then, in step S302, resolution conversion is performed. The resolution conversion is conversion performed by the resolution conversion portion 202, and the resolution of an image input in step S301 is converted into the print resolution of the image recording apparatus 800. Then, in step S303, color matching is performed. The color matching is processing that is performed by the color matching portion 203, and a color signal that depends on an image recording apparatus for recording an image of color reproduction suitable for set conditions is calculated. Then, in step S304, pixel color conversion is performed. The pixel color conversion is processing that is performed by the pixel color conversion portion 204, and a pixel color signal on the ratio of the numbers of pixels recorded in individual ink overlapped structures is calculated. The ink overlapped structure is a overlapped structure that can be recorded in each pixel on the recording medium, and a plurality of ink overlapped structures in which the combination of inks is the same are included. Then, in step S305, the halftone processing is performed. The halftone processing is processing that is performed by the halftone processing portion 205, and as a result of the halftone processing, the type of ink overlapped structure recorded in each pixel on the recording medium is set. Then, in step S306, the pass separation is performed. The pass separation is processing that is performed by the pass separation portion 206, and the discharge signal for each ink and each pass is generated. Finally, in step S307, the discharge of each ink is performed based on the ink discharge signal generated in step S306, and the image is recorded on the recording medium.

(Color Gamut of a Recorded Item)

Figure 4A:
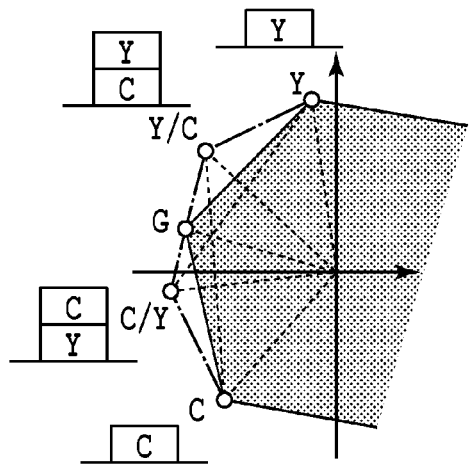
FIGS. 4A to 4D are schematic diagrams illustrating a difference between the color gamut of a recorded item recorded by the image recording system of each embodiment and the color gamut of a recorded item recording by a conventional image recording system.
Figure 4B:
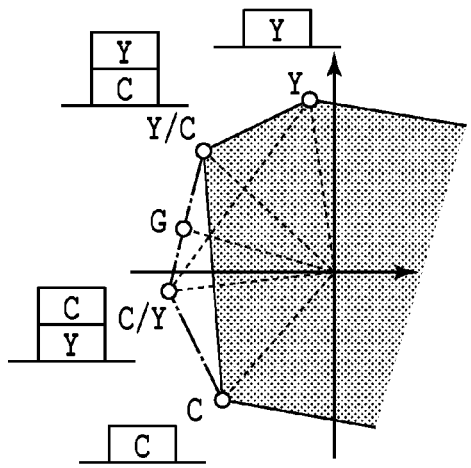
Figure 4C:
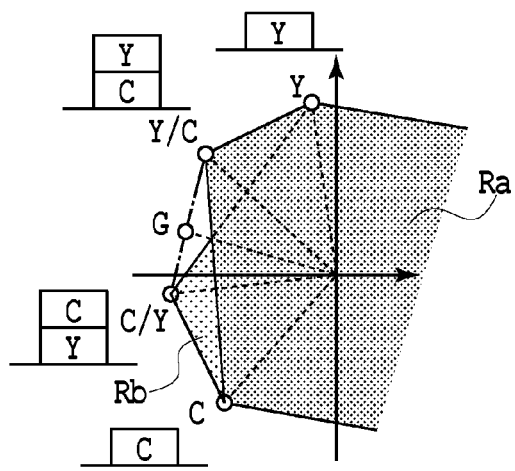
Figure 4D:
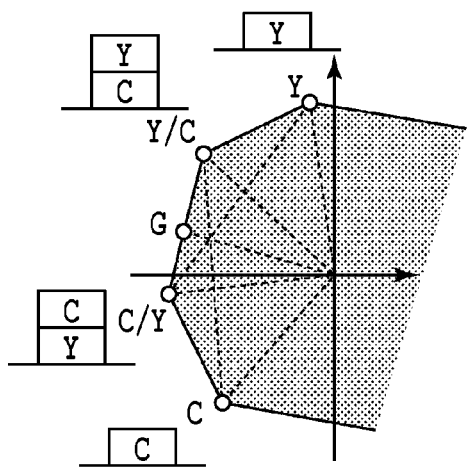

FIGS. 4A to 4D are diagrams illustrating a difference between the color gamut of a predetermined region of a recorded item recorded in the image recording system of the present embodiment and the color gamut of a predetermined region of a recorded item recorded in another image recording system. FIGS. 4A to 4D show a green region of a*, b* plane in a CIEL*a*b* color space where a* represents the horizontal axis and b* represents the vertical axis. FIG. 4A shows a color gamut in an image recording system that does not control a recording order. In this case, pixels in a structure A where recording is performed by overlapping the dots of Y ink on the dots of C ink and pixels in a structure B where recording is performed by overlapping the dots of C ink on the dots of Y ink are mixed. As a result, Y/C indicating the color when approximately all pixels are recorded in the structure A and C/Y indicating the color when approximately all pixels are recorded in the structure B are out of the color gamut, and thus cannot be reproduced. FIG. 4B shows a color gamut in an image recording system that can select only one type of ink overlapped structure, and this corresponds to a case where different inks are always recorded in the same recoding order. In this example, when the dots of Y ink are overlapped on the dots of C ink, recording is always performed by overlapping the dots of Y ink on the dots of C ink. Although, in this case, Y/C can be reproduced, C/Y and G indicating the color when approximately half of pixels are recorded in the structure A and the remaining half pixels are recorded in the structure B are out of the color gamut, and cannot be reproduced. FIG. 4C shows a color gamut in an image recording system that changes the recoding order according to the color to be recorded. In other words, this is an example of a case where the technology disclosed in Japanese Patent Laid-Open No. 2004-155181 described previously is applied. In this example, when the dots of C ink and the dots of Y ink are overlapped, a color in a region Ra is always recorded by overlapping the dots of Y ink on the dots of C ink whereas a color in a region Rb is always recorded by overlapping the dots of C ink on the dots of Y ink. In this case, although Y/C and C/Y can be reproduced, G falls out of a color gamut and thus cannot be reproduced. Furthermore, since the shape of the color gamut is complicated so as to include unevenness, disadvantageously, the color gamut compression processing has a problem of easily causing the reversal of the gradation. FIG. 4D shows the color gamut in the image recording system of the present embodiment. In the image recording system of the present embodiment, since the ratio of the numbers of pixels recorded in the individual ink overlapped structures of the group of ink overlapped structures is controlled such that the ratio continuously changes, it is possible to reproduce all Y/C, C/Y and G. The shape of the color gamut is prevented from having unevenness.

Figures 12A, 12B, 12C, 12D, 12E:
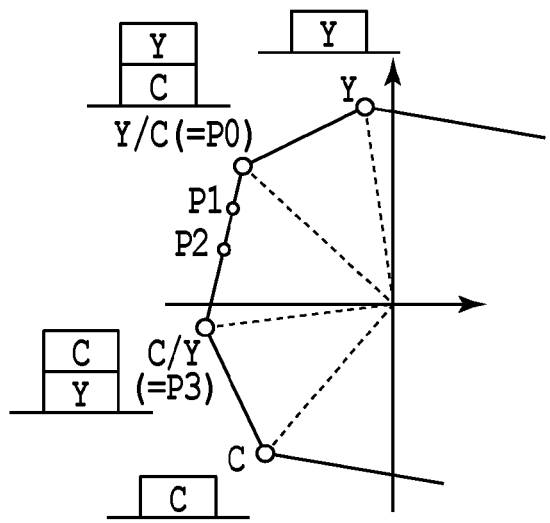
FIGS. 12A to 12E are schematic diagrams showing an example of the arrangement of pixels when colors in a green range are recorded in the image recording system of the embodiment.

FIGS. 12A to 12E are schematic diagrams showing an example of the arrangement of pixels when the image recording system of the present embodiment records a color in the green region. FIG. 12A shows the green region of the a*, b* plane in the CIEL*a*b* color space that is the same as shown in FIGS. 4A to 4D, and FIGS. 12B to 12E respectively show examples of the arrangement of pixels corresponding to the colors of P0 to P3 in FIG. 12A. In the image recording system of the present embodiment, as shown in FIGS. 12B and 12E, by the control of the recording order (overlapping order), it is possible to reproduce Y/C obtained by performing recording by overlapping Y on C and C/Y obtained by performing recording by overlapping C on Y. As shown in FIGS. 12C and 12D, by the control of the ratio between pixels recorded in the structure Y/C where recording is performed by overlapping Y on C and pixels recorded in the structure C/Y where recording is performed by overlapping C on Y, it is possible to reproduce colors other image recording systems cannot reproduce.

As described above, according to the image recording system of the present embodiment, it is possible to perform image recording with high color and gradation.

Second Embodiment

Although, in the first embodiment, a description has been given of the example where the ink overlapped structure is recorded by conducting the main scanning a plurality of times, in the second embodiment, a description will be given of an example where, by arranging a plurality of nozzle lines that discharge the same ink into the recording head, recording is performed by conducting the main scanning one time. The configurations other than the configurations of the recording head and the pass separation portion are the same as in the first embodiment, and thus their description will be omitted.

(Recording Heads)

Figure 15:
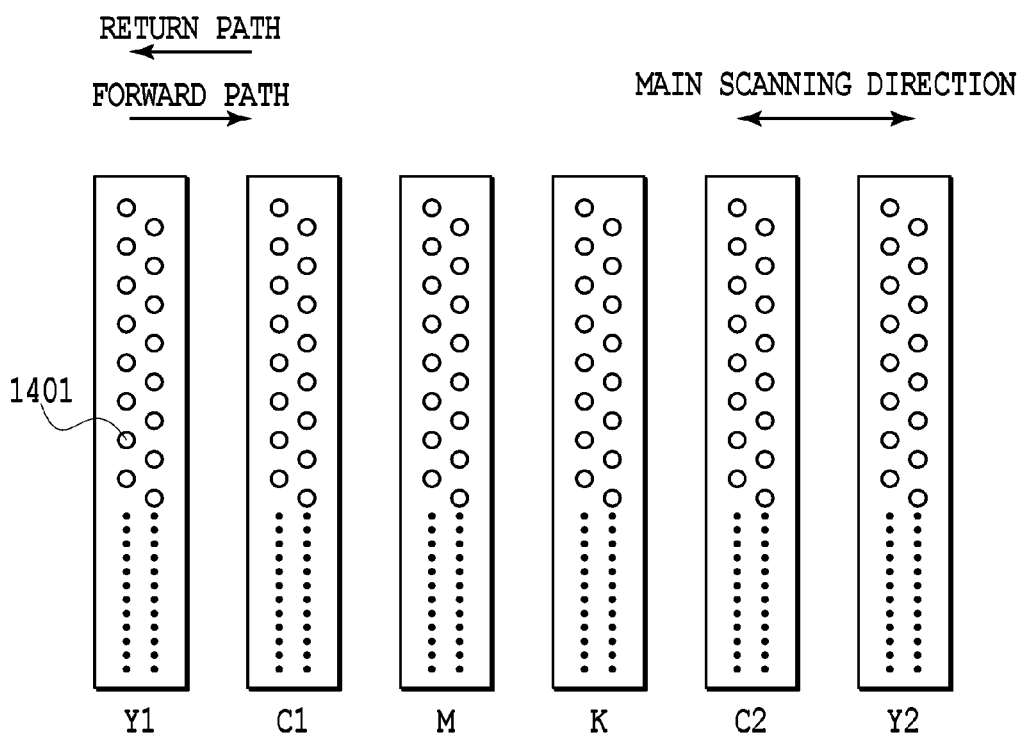
FIG. 15 is a schematic diagram showing an example of discharge port surfaces of the recording head of a second embodiment.

FIG. 15 is a schematic diagram showing an example of the discharge port surfaces of the recording heads according to the present embodiment. The recording heads of the present embodiment, in addition to a recording head for K ink and a recording head for M ink, include two recording heads for each of Y ink and C ink. The total of six recording heads is arranged side by side in order of Y, C, M, K, C and Y in the main scanning direction. Through the use of the recording heads described above, it is possible to record ink overlapped structures having different recording orders by conducting the main scanning one time both in a forward path in which the recoding head moves from the right-hand side to the left-hand side of the recording medium and in a return path in which the recording head moves from the left-hand side to the right-hand side of the recording head. For example, when the heads are defined as Y1, C1, M, K, C2 and Y2, preferably, in the structure where recording is performed by overlapping the dots of Y ink on the dots of C ink, the recording is performed with C1 and Y1 in the forward path, and the recording is performed with C2 and Y2 in the return path. Furthermore, preferably, in the structure where recording is performed by overlapping the dots of C ink on the dots of Y ink, the recording is performed with C2 and Y2 in the forward path, and the recording is performed with C1 and Y1 in the return path.

(Pass Separation Portion)

FIGS. 16A and 16B are schematic diagrams showing an example of the setting of the pass mask according to the present embodiment. FIG. 16A shows pass mask numbers corresponding to the type of ink overlapped structure, the type of color material and the scanning direction (the forward path and the returning way) of the recording head, and FIG. 16B is example of the pass mask corresponding to each of the pass mask numbers. It is possible to generate the binarized image corresponding to the discharge signal with the same method as in the first embodiment. In the present embodiment, for example, both a discharge signal for the forward path and a discharge signal for the return path are previously generated, and the discharge signal to be employed is selected depending on the scanning direction of the recording head at the time of recording.

As described above, according to the image recording system of the present embodiment, it is possible to record the ink overlapped structure by conducting the main scanning one time and thus reduce the time necessary for the recording.

Third Embodiment

Although, in the above embodiments, the examples where the ink overlapped structures having different recording orders are recorded have been described, in the third embodiment, an example with no consideration given to the recording order will be described. Meanwhile, since the configuration other than the pixel color conversion portion, the halftone processing portion and the pass separation portion is the same as in the first embodiment, its description will be omitted.

(Pixel Color Conversion Portion)

The pixel color conversion portion 204 of the present embodiment calculates, from the color signals (R", G" and B"), pixel color signals by referencing the pixel color conversion table stored in the pixel color conversion table storage portion 209, and outputs them. The pixel color signal is a color signal that has, as its component, a multi-value color signal related to each of the group of ink overlapped structures which can be recorded in each of the pixels on the recording medium.

The group of ink overlapped structures of the present embodiment is composed of, for example, 8 structures described below. The 8 structures first include: a paper-based structure in which dots of ink are not recorded, a structure in which only dots of K ink are recorded, and structures in which, likewise, respective dots of Y, M and C are individually recorded. Furthermore, the 8 structures include: a structure in which recording is performed by overlapping C dots and Y dots, a structure in which recording is performed by overlapping M dots and C dots, and a structure in which recording is performed by overlapping Y dots and M dots. In the present embodiment, the structure in which recording is performed by overlapping Y dots on C dots is not distinguished from the structure in which recording is performed by overlapping C dots on Y dots. Likewise, the structure in which recording is performed by overlapping C dots on M dots is not distinguished from the structure in which recording is performed by overlapping M dots on C dots, and the structure in which recording is performed by overlapping M dots on Y dots is not distinguished from the structure in which recording is performed by overlapping Y dots on M dots. Each pixel on the recording medium is recorded with any structure of the group of ink overlapped structures including the paper-based structure. The multi-value color signal (W, K, Y, M, C, Y/C, C/M and M/Y) related to each of the group of ink overlapped structures indicates, as in the first embodiment, the ratio of the numbers of pixels of respective structures recorded on the recording medium. It should be noted that unlike the first embodiment, Y/C does not only represent a structure in which recording is performed by overlapping Y dots on C dots, but also represents a structure in which recording is performed by overlapping C dots and Y dots. Likewise, C/M represents a structure in which recording is performed by overlapping M dots and C dots, and M/Y represents a structure in which recording is performed by overlapping Y dots and M dots. Furthermore, as in the first embodiment, W represents the paper-based structure. For example, when a pixel color signal (W, K, Y, M, C, Y/C, C/M and M/Y)=(0, 0, 0.5, 0, 0, 0.5, 0, 0), it indicates a recording state in which the number of pixels in a structure where only Y dots are recorded and the number of pixels in a structure where recording is performed by overlapping C dots and Y dots are each 50% of the total number of pixels. When all pixel color signals of 100 pixels vertically and 100 pixels horizontally are (0, 0, 0.5, 0, 0, 0.5, 0, 0), in half of the total pixels, that is, 5000 pixels, only Y dots are recorded, and, in the remaining 5000 pixels, recording is performed by overlapping C dots and Y dots. The total of components of the pixel color signal is constantly one.

Figures 17, 18:
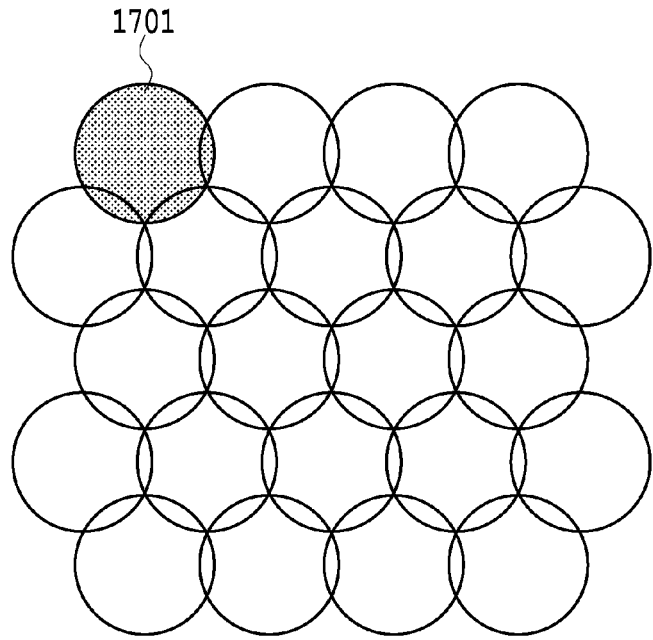
FIG. 17 is a schematic diagram showing an example of the arrangement of pixels in another embodiment.
FIG. 18 is a schematic diagram illustrating the configuration of a pixel color conversion table according to a third embodiment.

FIG. 18 is a schematic diagram illustrating the configuration of a pixel color conversion table stored in the pixel color conversion table storage portion 209 of the present embodiment. FIG. 18 shows a table including recording material overlapped structures in which two recording materials are overlapped from three recording materials, that is, yellow, cyan and magenta. As shown in FIG. 18, in the pixel color conversion table, pixel color signals (W, K, Y, M, C, Y/C, C/M and M/Y) corresponding to discrete color signals (R", G" and B") are described. A pixel color signal (W, K, Y, M, C, Y/C, C/M and M/Y) on an arbitrary color signal (R", G" and B") is calculated with a known 3DLUT method using the pixel color conversion table.

According to the image recording system of the present embodiment, by setting the pixel color conversion table appropriately, it is possible to accurately control the ink overlapped structure. For example, a pixel color signal in which components of Y/C, C/M and M/Y recorded by overlapping recording materials are zero is associated with a color signal (R", G" and B") corresponding to a bright color, and thus it is possible to suppress the superimposition of the recording materials and record an image having excellent grain quality. With the pixel color conversion table, for example, it is possible to associate a pixel color signal (0, 0, 0.5, 0, 0.5, 0, 0, 0) and a pixel color signal (0.5, 0, 0, 0, 0, 0.5, 0, 0) with different color signals (R", G" and B"). The former is a structure in which half of the pixels are recorded by only Y dots and the remaining half of the pixels are recorded by only C dots, and the latter is a structure in which half of the pixels are recorded by overlapping C dots and Y dots and the remaining half of the pixels have a paper-based structure. In each of them, the number of C dots is equal to the number of Y dots.

In a conventional technology in which the color signal (R", G" and B") is associated with the amount of recording material, it is impossible to record a plurality of different recording states where the amount of recording material is equal. In the present embodiment, in which, when colors of two types of recording states having different recording material superimpositions are different from colors of the other recording states, those two states can be recorded, it is possible to extend the color gamut as compared with a system in which only one state can be recorded and a system in which a state where two types are mixed can only be recorded.

Furthermore, since the number of ink overlapped structures that can be recorded in the respective pixels on the recording medium is limited, in a system where the color signal (R", G" and B") is associated with a specific ink overlapped structure, it is impossible to accurately control the recording state according to the color signal (R", G" and B").

On the other hand, a pixel color signal related to the ratio of the numbers of pixels of the ink overlapped structures can express approximately any recording state. In the image recording system of the present embodiment, the color signal (R", G" and B") related to the input color signal is associated with the pixel color signal described above, and thus it is possible to accurately control the recording state according to the color signal (R", G" and B"). Furthermore, in a system where the color signal (R", G" and B") is associated with a plurality of ink overlapped structures, since one pixel of an input signal is associated with a plurality of pixels, the resolution is reduced. In the image recording system of the present embodiment, since one pixel of the input signal is associated with one pixel of the pixel color signal, it is possible to suppress the reduction of the resolution.

(Halftone Processing Portion)

The halftone processing portion of the present embodiment is the same as the halftone processing portion 205 of the first embodiment except the components of the pixel color signal, and sets, by the use of the error diffusion method, the type of ink overlapped structure of each pixel on the recording medium, and outputs a color signal corresponding to the type. Specifically, the sum of error signals from neighbering pixels is added to the pixel color signal of the pixel of interest, and thereafter, as the ink overlapped structure of the pixel of interest, an ink overlapped structure corresponding to one of the components having the highest value is set. For example, when the pixel color signal of the pixel of interest is (0, 0, 0.5, 0, 0, 0.5, 0, 0), and the sum of error signals diffused from the neighbering pixels is (0, 0, 1, 0, 0, 0, 0, 0), the following processing is performed.

First, a determination signal that is the sum of the both is (W, K, Y, M, C, Y/C, C/M and M/Y)=(0, 0, 1.5, 0, 0, 0.5, 0, 0). In this case, the ink overlapped structure of the pixel of interest is set to a "structure where dots of Y ink are only recorded" that is the ink overlapped structure corresponding to the Y component of the highest value. Then, for the pixel of interest, the color signal Y corresponding to the ink overlapped structure is output. Furthermore, the error signal is a value that is obtained by subtracting, from the determination signal, the pixel color signal corresponding to the set ink overlapped structure. In the example described above, the pixel color signal corresponding to the set ink overlapped structure is (W, K, Y, M, C, Y/C, C/M, M/Y)=(0, 0, 1, 0, 0, 0, 0, 0). In this case, the error signal is (W, K, Y, M, C, Y/C, C/M, M/Y)=(0, 0, 0.5, 0, 0, 0.5, 0, 0).

(Pass Separation Portion)

Figures 19A, 19B:
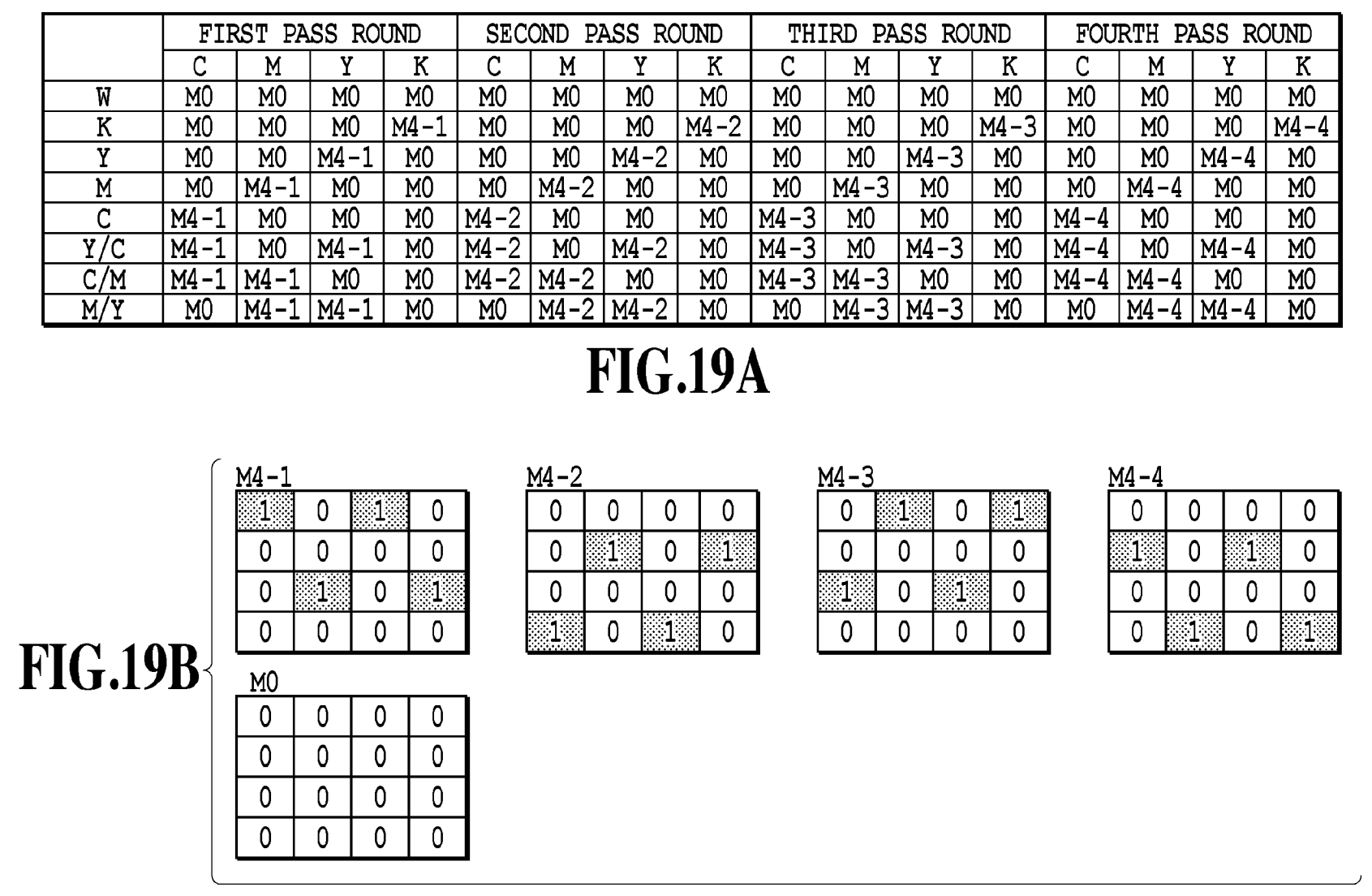

FIGS. 19A and 19B are schematic diagrams showing an example of the setting of a pass mask in the present embodiment. FIG. 19A shows pass mask numbers corresponding to the type of ink overlapped structure and the type of color material, and FIG. 19B shows an example of a pass mask corresponding to each of the pass mask numbers. A binarized image corresponding to the discharge signal of each recording material can be generated in the same method as in the first embodiment.

As described above, according to the image recording system of the present embodiment, it is possible to accurately control the superimposition of recording materials. Consequently, it is possible to perform image recording with high grain quality and color.

Fourth Embodiment

In the above embodiments, the example where the error diffusion method is utilized in the halftone processing is described. Since, in the error diffusion method, in order to determine the signal of a pixel that is subsequently processed based on an error signal from a pixel that has been previously processed, it is impossible to simultaneously process a plurality of pixels, and thus the processing is disadvantageously time-consuming. In the fourth embodiment, a description will be given of an example where a random number generator is utilized and thus it is possible to simultaneously process respective pixels. Meanwhile, since the configuration other than the halftone processing portion is the same as in the third embodiment, its description will be omitted.

(Halftone Processing Portion)

The halftone processing portion of the present embodiment utilizes the random number generator and thus sets the type of ink overlapped structure of each pixel on the recording medium and outputs a color signal corresponding to the type.

Figure 20:
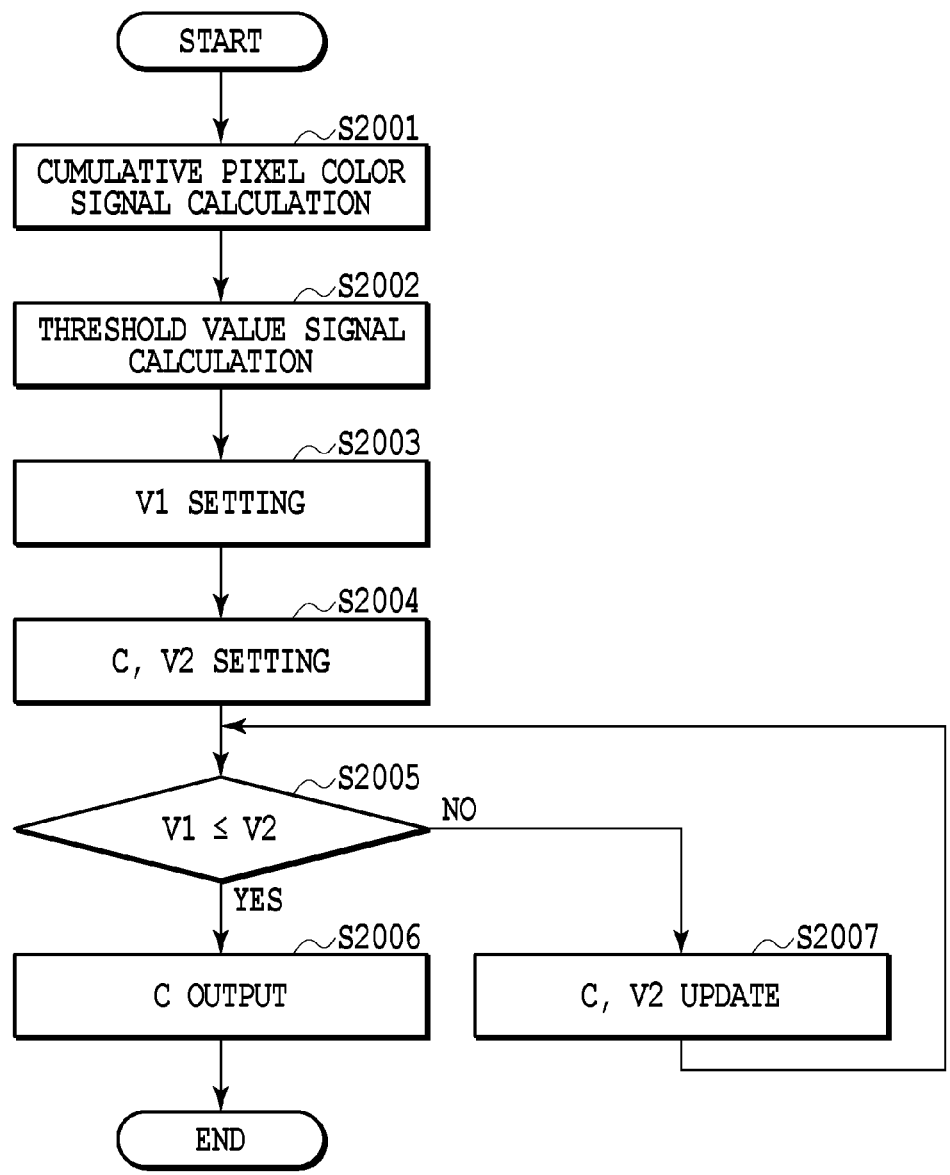
FIG. 20 is a flowchart showing a processing procedure of a halftone processing portion in a fourth embodiment.

FIG. 20 is a flowchart showing a processing procedure of the halftone processing portion in the fourth embodiment. According to the present embodiment, the type of ink overlapped structure of the pixel of interest is determined as follows. First, in step S2001, a cumulative pixel color signal is calculated from the pixel color signal of the pixel of interest. As with the pixel color signal, the cumulative pixel color signal has components corresponding to the ink overlapped structures that can be recorded in the respective pixels on the recording medium, and the value of the nth component of the cumulative pixel color signal is a signal that is given by summing values from the value of the first component of the pixel color signal to the value of the nth component. For example, when the pixel color signal is (0.2, 0.2, 0.2, 0.2, 0.2, 0, 0, 0), the cumulative pixel color signal (W', K', Y', M', C', Y/C', C/M', M/Y') is (0.2, 0.4, 0.6, 0.8, 1, 1, 1, 1). Furthermore, when the pixel color signal is (0.5, 0.5, 0, 0, 0, 0, 0, 0), the cumulative pixel color signal is (0.5, 1, 1, 1, 1, 1, 1, 1).

Next, in step S2002, a threshold value signal (second signal) is calculated from the cumulative pixel color signal. The threshold value signal is a signal that is obtained by increasing the value of each component of the cumulative pixel color signal by a factor of A. Here, the constant A is, for example, 256. In this case, when the cumulative pixel color signal is (0.5, 1, 1, 1, 1, 1, 1, 1), the threshold value signal (W", K", Y", M", C", Y/C", C/M", M/Y") is (128, 256, 256, 256, 256, 256, 256, 256).

Then, in step S2003, by utilizing the random number generator, the generator generates any one of integer values from 1 to the constant A and sets it to a variable V1. As the random number generator described above, a random number generator is utilized that generates any value with the same probability.

Next, in step S2004, a color signal value W indicating the type of ink overlapped structure corresponding to the first component of the threshold value signal is set to a variable C, and the value of this component is set to a variable V2. For example, when the threshold value signal (W", K", Y", M", C", Y/C", C/M", M/Y") is (128, 256, 256, 256, 256, 256, 256, 256), 128 is set to V2.

Then, in step S2005, the value of V1 and the value of V2 are compared and thus which of them is larger is checked. If the value of V1 is equal to or less than the value of V2, the process proceeds to step S2006. If not, the process proceeds to step S2007.

In step S2006, the variable C is output as a color signal indicating the type of ink overlapped structure of the pixel of interest, and the halftone processing for the pixel of interest is completed.

In step S2007, the values of the variable C and the variable V2 are updated, and the process proceeds to step S2005. Specifically, a color signal indicating the type of ink overlapped structure corresponding to the subsequent component of the threshold value signal is set to the variable C, and the value of the current component of the threshold value signal is set to the variable V2. For example, if the value of the variable C before the processing in step S2007 is W, the value of the variable C after the processing is K. Furthermore, if the value of the variable C before the processing is Y/C, the value of the variable C after the processing is C/M.

By performing the processing described above, it is possible to independently determine the ink overlapped structure of the pixel of interest regardless of processing on other pixels. Therefore, the processing on a plurality of pixels is simultaneously performed, and thus it is possible to increase the speed of the processing. Moreover, the ink overlapped structure of each pixel is approximately determined according to a predetermined ratio indicated by the pixel color signal. That is, when all pixel color signals of 100 pixels vertically and 100 pixels horizontally are (0, 0, 0.5, 0, 0, 0.5, 0, 0), about 5000 pixels are recorded in a structure where only Y dots are only recorded, and the remaining about 5000 pixels are recorded in a structure where recording is performed by overlapping C dots and Y dots.

As described above, according to the image recording system of the present embodiment, it is possible to simultaneously perform the halftone processing on the respective pixels and increase the speed of the processing. It should be noted that although the configuration of present embodiment is described based on the configuration of the third embodiment with no consideration given to the recording order, it can be applied to the configurations of the first embodiment and the second embodiment with consideration given to the ink overlapped structures having different recording orders.

<Variation of the Fourth Embodiment>

Although, in the fourth embodiment, a description is given of the example where the random number generator is utilized in the halftone processing portion, in this variation, a description will be given of an example where a dither matrix is utilized. Since the configuration other than the halftone processing portion is the same as in the fourth embodiment, its description will be omitted.

(Halftone Processing Portion)

The halftone processing portion of the present embodiment utilizes the dither matrix and thus sets the type of ink overlapped structure of each pixel on the recording medium, and outputs a color signal corresponding to the type. Specifically, instead of a value generated by the random number generator, the corresponding value of the dither matrix is set to the value of the variable V1 set in step S2003 in FIG. 20. Furthermore, as the constant A utilized for calculating the threshold value signal in step S2002, the total number of cells of the dither matrix is utilized. For example, when the size of the dither matrix is the total of 131072 cells with 256 cells vertically and 512 cells horizontally, 131072 is set to the constant A. The other processing procedure is the same as in the fourth embodiment.

FIG. 21 shows an example of the dither matrix utilized by the halftone processing portion of the present variation. This dither matrix is composed of the total of 256 cells with 16 cells vertically and 16 cells horizontally, and in each of the cells, any integer value from 1 to 256 is stored so that the integer values do not overlap each other. The size of the dither matrix is not limited to this size, and various sizes can be used. When a dither matrix with Dy cells vertically and Dx cells horizontally is used, any integer value from 1 to Dy×Dx is stored in each cell so that the integer values do not overlap each other. For example, when a dither matrix with 256 cells vertically and 512 cells horizontally is used, any integer value from 1 to 131072 is stored so that the integer values do not overlap each other. Preferably, the value stored in each cell of the dither matrix is set by a dot dispersed ordered dither method that is typified by a Bayer dither matrix. In this case, since the pixels of the same ink overlapped structure are dispersed and set, as compared with the fourth embodiment, it is possible to obtain a recording image having excellent quality in terms of grain quality.

Figure 22:
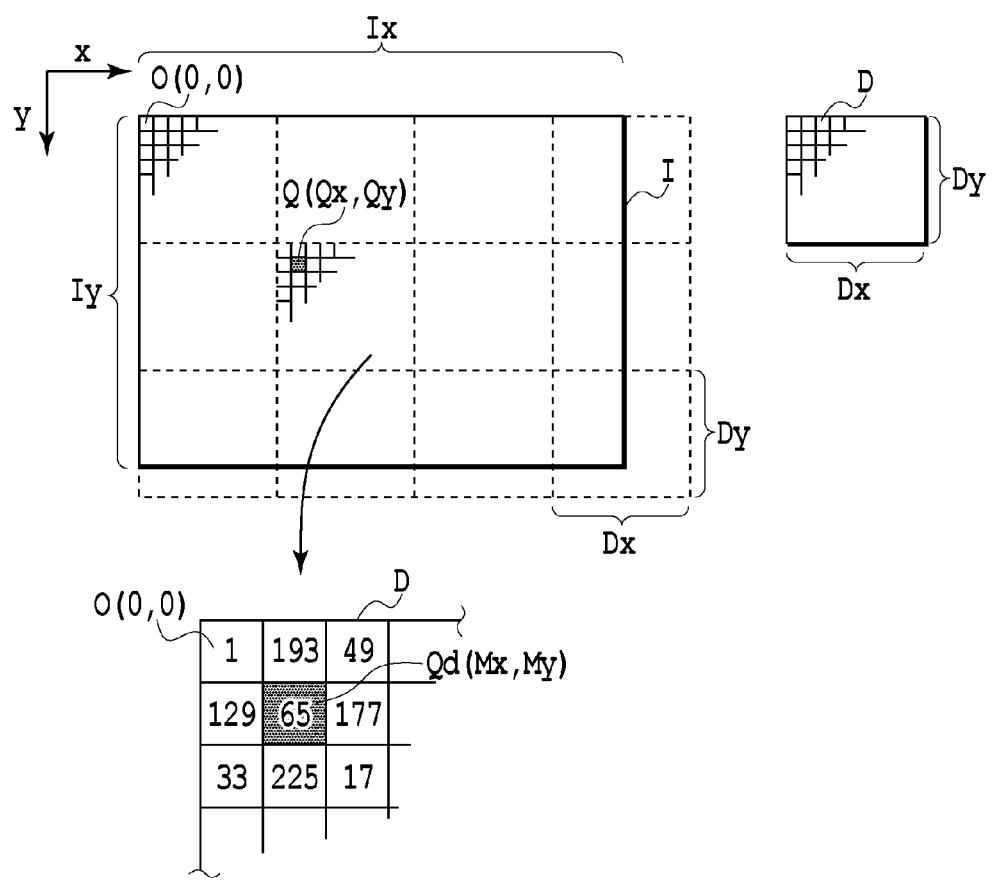
FIG. 22 is a schematic diagram illustrating a method of acquiring the value of the dither matrix in the fourth embodiment.

FIG. 22 is a schematic diagram illustrating a method of acquiring a value of the dither matrix corresponding to the pixel of interest. In an image I composed of the pixel color signals of pixels with Iy pixels vertically and Ix pixels horizontally, a block is set for each of pixels with Dy pixels vertically and Dx pixels horizontally that are the size of the dither matrix D. In the figure, each block is shown by being divided by broken lines. The dither matrix D is overlapped on a block where the pixel of interest Q is present. The value of the dither matrix corresponding to the pixel of interest Q is the value of the cell of the dither matrix that coincides with the position of the pixel of interest Q. The position of the pixel in the upper left corner of the image I and the position of the cell in the upper left corner of the dither matrix D are set as O (0, 0). When the position of the pixel of interest in the image I is set as Q (Qx, Qy), the remainder obtained by dividing Qx by Dx is Mx and the remainder obtained by dividing Qy by Dy is My, the value of the dither matrix corresponding to the pixel of interest is the value of the cell in the position (Mx, My) of the dither matrix D.

As described above, according to the image recording system of the present modification, it is possible to perform high-speed processing without use of the random number generator.

Other Embodiments (Type of Recording Material)

Although, in each of the above embodiments, the configuration of the four color inks of C, M, Y and K has been described as a set of inks, the technologies described in the embodiments can be applied to recording devices having special color inks such as a light color ink and a red ink of low density, a transparent clear ink or the like. The technologies described in the embodiments can also be applied to a recording device that can perform a plurality of types of recording having different discharge amounts, by using the same type of ink. In each case, in the group of ink overlapped structures, the ink overlapped structure which is constituted by controllable recoding elements (for example, a red ink, a clear ink, a small discharge amount of black ink and a large discharge amount of black ink) is preferably set.

(Recording Material Overlapped Structure)

Although, in each of the embodiments, a description has been given of a case where two inks are overlapped, three or more inks may be overlapped. For example, the application to an image recording apparatus that can record an ink overlapped structure where the dots of Y ink are overlapped on the dots of C ink, and furthermore, the dots of C ink are overlapped thereon is also possible.

(Image Processing)

The resolution conversion method is not limited to the bi-cubic method. Additionally, it is preferable to perform conversion into a resolution corresponding to the arrangement of dots on the recording medium. Furthermore, preferably, the dots of different pixels on the recording medium are overlapped as little as possible without any space therebetween. FIG. 17 is a schematic diagram showing an example of the arrangement of pixels suitable for the present invention; the pixels on the recording medium are more closely arranged. Reference numeral 1701 in the figure represents one pixel. When this type of pixel arrangement is utilized, the resolution conversion portion preferably performs, from data on an input image, interpolation calculation on a color signal in each pixel position. As the halftone processing, dot concentration type processing for recording pixels having the same type of the ink overlapped structure at a predetermined grain size in a concentrated manner may be utilized. For example, this type of processing can be realized by assigning weights to components of the pixel color signal of each pixel and then performing error diffusion on them. By utilizing this type of processing, it is possible to improve color stabilization and grain quality in an image recording apparatus having a low accuracy of the position of dots. The setting of the pass mask and the pass mask are not limited to the configuration of each of the embodiments described above. As in the halftone processing, through the use of the dot concentration type pass mask, it is possible to improve grain quality in the image recording apparatus having a low accuracy of the position of dots.

(Configuration of the Image Recording Apparatus)

Although, in the first embodiment, the configuration of the four pass recording has been described, the number of times of the main scanning is not limited to four. Recording may be performed by conducting the main scanning twice or eight times. Furthermore, the present invention is also effectively applicable to a full line type inkjet printer that does not conduct main scanning. Moreover, the present invention is also applicable to an image recording apparatus using another recording system such as an electronic photographic printer or a sublimation printer. In this case, toner, ink ribbon or the like is utilized instead of ink as the recording material. Although, in each of the above embodiments, a description has been given of the example of the image recording system combined with the host computer as the aspect of the invention, the aspect of the invention may be the aspect of an image recording apparatus used as an image output terminal of an information processing apparatus such as a computer. In addition, only an image recording apparatus in which the functions of performing various types of processing conducted by the host computer are incorporated may constitute the image recording system of the present invention. Furthermore, the aspect of the invention may be the aspect of a copying device combined with a reader or the like, the aspect of a facsimile device having the function of reception and transmission or the like.

(Program and Recording Medium)

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-185199, filed Aug. 20, 2010, and 2011-149350, filed Jul. 5, 2011, which are hereby incorporated by reference herein in their entirety.

What is claimed is:

1. An image recording system comprising:
a conversion unit configured to convert input color signals constituting an input image into signals constituting a group of recording material overlapped structures that includes a recording material overlapped structure in which at least two or more recording materials are overlapped to form pixels and includes mixed plural structures in which amounts of the overlapped recording materials are equal to each other and order of overlapping is different, wherein the converted signals indicate a ratio of each number of pixels of the recording material overlapped structures, and wherein the ratio is continuously changed according to the continuous change of the input color signals; and
a recording unit configured to record the recording materials on a recording medium in accordance with the converted signals;
wherein the recording unit includes a setting unit that sets, from the signals converted by the conversion unit, the recording material overlapped structure in each of the pixels on the recording medium, and the setting unit sets the recording material overlapped structure based on a first signal converted by the conversion unit and an error signal from neighboring pixels.

2. The image recording system of claim 1, wherein the conversion unit converts the input color signals into signals constituting the group of recording material overlapped structures that includes a recording material overlapped structure in which the recording order is reverse.

3. The image recording system of claim 1, wherein the conversion unit converts the input color signals into signals constituting the group of recording material overlapped structures that includes recording material overlapped structures in which recording order is different, on at least one of three combinations obtained by selecting two recording materials from three recording materials of yellow, cyan and magenta.

4. The image recording system of claim 1, wherein the conversion unit converts the input color signals into signals constituting the group of recording material overlapped structures that includes a structure in which a recording material of cyan is overlapped on a recording material of yellow and a structure in which the recording material of yellow is overlapped on the recording material of cyan.

5. The image recording system of claim 1, wherein the conversion unit converts the input color signals into signals constituting the group of recording material overlapped structures that includes a paper-based structure indicating a color of paper on which no ink is recorded.

6. The image recording system of claim 1, wherein the setting unit sets, from the first signal converted by the conversion unit and a second signal generated by a random number generator, the recording material overlapped structure corresponding to the second signal, in the group of recording material overlapped structures that constitutes the first signal.

7. The image recording system of claim 1, wherein the setting unit sets, from the first signal converted by the conversion unit and the second signal acquired from a dither matrix, the recording material overlapped structure corresponding to a second signal, in the group of recording material overlapped structures that constitutes the first signal.

8. The image recording system of claim 1, wherein the conversion unit converts the input color signals into the signals using table defining a relationship between the input color signals and the recording material overlapped structure.

9. The image recording system of claim 1, wherein in case that the continuous change of the input color signals indicates a change of color from yellow to cyan, the ratio of each number of pixels of the recording material overlapped structures that includes a structure in which a recording material of cyan is overlapped on a recording material of yellow becomes greater than in case that the input color signals indicates yellow.

10. An image recording method comprising the steps of:

converting input color signals constituting an input image into signals constituting a group of recording material overlapped structures that includes a recording material overlapped structure in which at least two or more recording materials are overlapped to form pixels and includes mixed plural structures in which amounts of the overlapped recording materials are equal to each other and order of overlapping is different, wherein the converted signals indicate a ratio of each number of pixels of the recording material overlapped structures, and wherein the ratio is continuously changed according to the continuous change of the input color signals; and recording the recording materials on a recording medium in accordance with the converted signals;

wherein the recording steps includes a setting step that sets, from the signals converted by the conversion step, the recording material overlapped structure in each of the pixels on the recording medium, and the setting step sets the recording material overlapped structure based on a first signal converted by the conversion step and an error signal from neighboring pixels.

11. A non-transitory computer readable recording medium in which a program for causing a computer to perform an image recording method comprising the steps of:

converting input color signals constituting an input image into signals constituting a group of recording material overlapped structures that includes a recording material overlapped structure in which at least two or more recording materials are overlapped to form pixels and includes mixed plural structures in which amounts of the overlapped recording materials are equal to each other and order of overlapping is different, wherein the converted signals indicate a ratio of each number of pixels of the recording material overlapped structures, and wherein the ratio is continuously changed according to the continuous change of the input color signals; and recording the recording materials on a recording medium in accordance with the converted signals;

wherein the recording steps includes a setting step that sets, from the signals converted by the conversion step, the recording material overlapped structure in each of the pixels on the record medium, and the setting step sets the recording material overlapped structure based on a first signal converted by the conversion step and an error signal from neighboring pixels.

* * * * *